(12) United States Patent
Ueki et al.

(10) Patent No.: US 7,233,563 B2
(45) Date of Patent: Jun. 19, 2007

(54) POLARIZING OPTICAL ELEMENT AND DISPLAY DEVICE INCLUDING THE SAME

(75) Inventors: Shun Ueki, Nara (JP); Tokio Taguchi, Tenri (JP); Satoshi Shibata, Tenri (JP); Kiyoshi Minoura, Nara (JP); Masahiro Shimizu, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 585 days.

(21) Appl. No.: 10/866,835

(22) Filed: Jun. 15, 2004

(65) Prior Publication Data

US 2004/0264350 A1    Dec. 30, 2004

(30) Foreign Application Priority Data

Jun. 25, 2003  (JP)  ............................. 2003-180995
May 26, 2004  (JP)  ............................. 2004-156463

(51) Int. Cl.
*G11B 7/00*  (2006.01)
(52) U.S. Cl. ................................. 369/112.03
(58) Field of Classification Search ..................... None
See application file for complete search history.

(56) References Cited

U.S. PATENT DOCUMENTS 6,532,111 B2   3/2003  Kurtz et al.
6,577,361 B1   6/2003  Sekiguchi et al.
6,804,180 B2*  10/2004 Katayama ................ 369/44.32

FOREIGN PATENT DOCUMENTS

| JP | 09-090122 | 4/1997 |
| WO | WO 00/33132 | 6/2000 |
| WO | WO 00/79317 A1 | 12/2000 |
| WO | WO 01/18570 A1 | 3/2001 |
| WO | WO 01/51964 A1 | 7/2001 |

* cited by examiner

*Primary Examiner*—Paul Huber
(74) *Attorney, Agent, or Firm*—Keating & Bennett, LLP

(57) ABSTRACT

A polarizing optical element changes its optical reflectance and/or transmittance according to a polarization state of incoming light. The optical element includes: a first grating layer including multiple striped portions that extend in a predetermined direction; and a second grating layer including multiple striped portions that extend in that predetermined direction. Average grating pitches of the first and second grating layers are both defined to be shorter than the wavelength of the incoming light. The first grating layer is made of a first material that exhibits a light reflecting property to the incoming light. The second grating layer is made of a second material that reduces the reflection of the incoming light from the first grating layer.

13 Claims, 13 Drawing Sheets

TE Wave

TE Wave

TM Wave

POLARIZING OPTICAL ELEMENT AND DISPLAY DEVICE INCLUDING THE SAME

BACKGROUND OF THE INVENTION

1. Field of the Invention

The present invention relates to a polarizing optical element and a display device including the optical element.

2. Description of the Related Art

An absorbing dichroic polarizer is currently used most extensively among various other types of polarizers. The absorbing dichroic polarizer is obtained by adsorbing a compound with light absorption anisotropy (e.g., iodine or a dichroic dye) onto a stretched polymer film and orienting the compound. This polarizer decomposes incoming light into polarization components that cross each other at right angles, absorbs polarization components that are parallel to the absorption axis of the dichroic dye and transmits polarization components that are perpendicular to the absorption axis. Accordingly, the light that has been transmitted through the polarizer becomes linearly polarized light. However, if such an absorbing polarizer is used in a display device, then the transmittance to natural light can never exceed 50% in principle, thus resulting in low optical efficiency.

To minimize the loss caused by the absorption of light into such an absorbing dichroic polarizer, another type of polarizer, which reflects linearly polarized light with a particular polarization direction and transmits polarized light with the other directions, was developed and already used actually. Such a linearly polarized light reflecting polarizer is a stack of non-absorbing dielectric materials (e.g., obtained by alternately stacking two different types of polymers A and B as ABABA . . . ). Such a polarizer is formed by alternately stacking the two types of materials A and B and then extruding them together. Accordingly, the stacked materials are stretched along one axis (which will be referred to herein as an "x-axis") but are hardly stretched along the other axis (which will be referred to herein as a "y-axis"). This is why the polarizer exhibits high reflectance to the linearly polarized light that is polarized in the x-axis direction and high transmittance to the linearly polarized light that is polarized in the y-axis direction. If that stack is designed such that the thicknesses of the respective layers change vertically, a reflective polarizer, exhibiting high reflectance to visible light in a broad range, can be obtained.

A polarizer with a micro metal grating (wire grating) is another known type of linearly polarized light reflecting polarizer (see Japanese Laid-Open Publication No. 9-90122, for example). This polarizer has a structure in which metal wires made of the same metallic material are arranged parallel to each other. The diameter of the respective metal wires is sufficiently smaller than the wavelength of the incoming light. This type of wire grating polarizer has polarization properties of reflecting polarization components that are parallel to the metal wires (i.e., a TE wave) and transmitting polarization components that are perpendicular to the metal wires (i.e., a TM wave).

When a reflecting polarizer is used in a display device, the polarizer exhibits an identical reflectance to the same polarized light ray that enters the upper surface and the lower surface of the polarizer, thus increasing the optical efficiency. However, if this polarizer is used by itself in a display device, dark display is not realized due to low light attenuation and therefore the contrast decreases on the screen. To achieve the dark display, the display device needs to include the reflecting polarizer and the absorbing polarizer in combination. In that case, however, the number of required components and the manufacturing cost both increase. In addition, the thickness of the display device also increases by the thickness (of about 100 µm) of the absorbing polarizer.

SUMMARY OF THE INVENTION

In order to overcome the problems described above, preferred embodiments of the present invention provide a polarizing optical element, which is thin, ensures excellent optical efficiency, and achieves a high contrast ratio even when applied to a display device by itself.

A polarizing optical element according to a preferred embodiment of the present invention preferably changes its optical reflectance and/or transmittance according to a polarization state of incoming light. The optical element preferably includes: a first grating layer including multiple striped portions that extend in a predetermined direction; and a second grating layer including multiple striped portions that extend in that predetermined direction. Average grating pitches of the first and second grating layers are preferably both defined to be shorter than the wavelength of the incoming light. The first grating layer is preferably made of a first material that exhibits a light reflecting property to the incoming light. The second grating layer is preferably made of a second material that reduces the reflection of the incoming light from the first grating layer.

In one preferred embodiment of the present invention, the second material preferably exhibits a light absorbing property.

In another preferred embodiment, the reflectance exhibited by the second material to the incoming light is preferably lower than that exhibited by the first material to the light.

In still another preferred embodiment, the multiple striped portions of the first grating layer preferably have the same shape as, and overlap with, the striped portions of the second grating layer.

In yet another preferred embodiment, each said striped portion of the first grating layer and an associated one of the striped portions of the second grating layer preferably make up a multilayer structure that is supported on a substrate.

In this particular preferred embodiment, the multilayer structure is preferably asymmetric when rotated 180 degrees around an axis that is defined in the predetermined direction.

Alternatively or additionally, the first grating layer may be either the lowermost or uppermost layer of the multilayer structure.

In yet another preferred embodiment, the first grating layer is preferably provided on one surface of the substrate and the second grating layer is preferably provided on the other surface of the substrate.

In yet another preferred embodiment, the first grating layer preferably exhibits a reflectance exceeding 50% to a linearly polarized visible light ray.

In yet another preferred embodiment, the optical element preferably further includes a transparent layer, which covers the multiple striped portions and has a substantially flat surface.

In a specific preferred embodiment, the transparent layer is preferably made of a dielectric material.

A display device according to a preferred embodiment of the present invention includes the polarizing optical element according to any of the preferred embodiments of the present invention described above.

A liquid crystal display device according to a preferred embodiment of the present invention preferably includes a first substrate, a second substrate, and a liquid crystal layer sandwiched between the first and second substrates so as to conduct a display operation by applying a voltage to the liquid crystal layer. The liquid crystal display device preferably further includes a polarizing optical element, which is provided between the first substrate and the liquid crystal layer so as to change its optical reflectance and/or transmittance according to a polarization state of incoming light. The polarizing optical element preferably has a multilayer structure including multiple striped portions that are arranged on the first substrate so as to extend in a predetermined direction. An average grating pitch of the multilayer structure is preferably defined to be shorter than the wavelength of the incoming light. The multilayer structure preferably includes: a first grating layer, which is made of a first material that exhibits a light reflecting property to the incoming light; and a second grating layer, which is provided closer to the liquid crystal layer than the first grating layer is and which is made of a second material that reduces the reflection of the incoming light from the first grating layer.

Various preferred embodiments of the present invention described above provide a polarizing optical element, which is thin and ensures excellent optical efficiency. Thus, by applying a polarizing optical element according to a preferred embodiment of the present invention to a display device, a high-contrast image can be displayed.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1A:
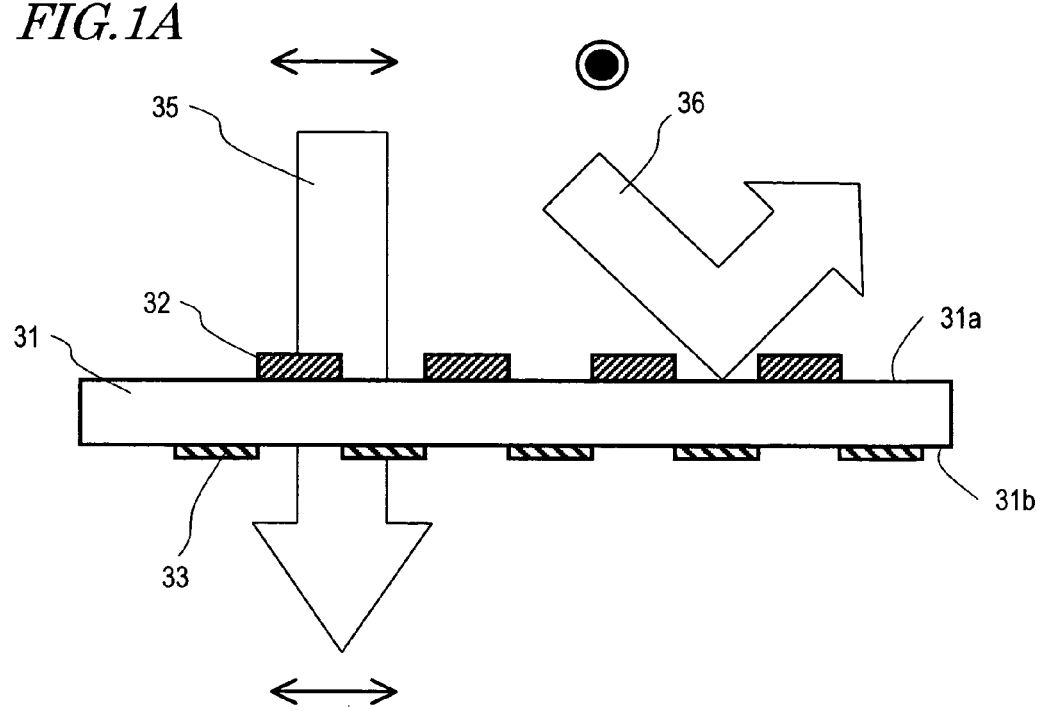
FIGS. 1A and 1B are cross-sectional views schematically illustrating the operating principle of a polarizing optical element including a reflective grating layer on one surface of its substrate and an absorptive grating layer on the other surface, respectively.

In a polarizing optical element according to a preferred embodiment of the present invention, a multilayer structure, including a grating film with an antireflection effect and a grating film with a light reflecting property (which will be sometimes referred to herein as a "light reflective film"), is preferably provided on a substrate. The multilayer structure may include a metal, a dielectric, a semiconductor and so on.

A polarizing optical element according to a preferred embodiment of the present invention preferably includes a first grating layer including multiple striped portions that extend in a predetermined direction and a second grating layer including multiple striped portions that extend in the same direction as the counterparts of the first grating layer. The average grating pitches of the first and second grating layers are both shorter than the wavelength of the light entering this optical element. As used herein, the "average grating pitch" refers to the distance between the centerlines of two adjacent striped portions as measured laterally in the grating layer. The first grating layer is preferably made of a first material that exhibits a light reflecting property to the incoming light. For example, the first grating layer may exhibit a reflectance exceeding 50% to linearly polarized visible light. On the other hand, the second grating layer is preferably made of a second material that reduces the reflection of the incoming light from the first grating layer.

To minimize the reflection from a light reflective film (i.e., the first grating layer) by using a film with antireflection effect (i.e., the second grating layer) may be either (A) antireflection achieved by providing a non-interfering light absorptive film closer to the light source than a light reflective film of a metal, for example, or (B) antireflection achieved by controlling the optical admittance between the light reflective film and overlying multilayer structure by utilizing thin film interference and absorption. The latter antireflection (B) includes (B1) antireflection achieved by providing a transparent film closer to the light source than the light reflective film is, (B2) antireflection achieved by providing a light absorptive film closer to the light source than the light reflective film is, and (B3) antireflection achieved by providing a multilayer coating as an interference filter for the light reflective film. According to the antireflection technique (B), just by providing a single film with antireflection effect, conditions for total antireflection are satisfied with respect to a single-color light ray with a particular wavelength. Also, if a plurality of such antireflection films are used, antireflection is achieved in a broad wavelength range. For example, by using a multilayer structure including a stack of a few antireflection films and by appropriately determining the materials and thicknesses of the respective layers, a polarizing optical element, which achieves antireflection in t h e entire visible radiation range, can be obtained. Such a polarizing optical element, achieving antireflection in a broad wavelength range, can find a broader variety of applications (e.g., can be used effectively in a direct-viewing type multi-color display device).

A polarizing optical element according to a preferred embodiment of the present invention has such a configuration and therefore can adaptively change the optical reflectance and/or transmittance according to the polarization state of the incoming light. More specifically, if a linearly polarized light ray TE, oscillating in the direction in which those striped portions extend, is incident on the first grating layer, most of the linearly polarized light ray TE is reflected. However, if the linearly polarized light ray TE is incident on the second grating layer, then most of the linearly polarized light ray is absorbed thereto. On the other hand, most of a linearly polarized light ray TM, oscillating perpendicularly to the direction in which those striped portions extend, is transmitted through the first and second grating layers. Accordingly, the reflectance of a light ray impinging on one surface of the optical element (which will be referred to herein as a "surface I") may be controlled by the first grating layer, while the reflectance of a light ray impinging on the other surface thereof (which will be referred to herein as a "surface II") may be controlled by the second grating layer. If the second material of the second grating layer exhibits light absorbing property, a high-contrast display is realized by applying this optical element to a display device. Also, the second material may have a lower reflectance than the first material. As the first or second material, a metal, a dielectric, a semiconductor or any other suitable material may be used.

In this manner, a polarizing optical element according to a preferred embodiment of the present invention can function as not only an absorptive or reflective polarizer but also a polarizer unit as a combination of these two types of polarizers. Also, when used in a display device, the polarizing optical element can increase the display contrast by selecting appropriate materials as the first and second materials. In addition, the thickness of a polarizing optical element according to a preferred embodiment of the present invention (e.g., about 0.2 µm or at most about 1 µm when the grating layers are covered with a protective coating) is much smaller than that of a conventional absorptive or reflective polarizer (e.g., about 100 µm). Thus, the optical element and a display device including the optical element can have significantly reduced thicknesses. In particular, the optical element can be about one-hundredth as thick as a polarizer unit, including an absorptive polarizer and a reflective polarizer in combination, for use in a conventional display device.

Those striped portions of the first grating layer may have the same shape as, and overlap with, those of the second grating layer. Such grating layers are obtained by depositing the first and second materials in the same pattern on the same surface of the substrate and then patterning the stack into those striped shapes. Since these two layers can be patterned at the same time, the manufacturing process can be simplified.

A polarizing optical element according to another preferred embodiment of the present invention may have a multilayer structure consisting of at least two layers including the first and second grating layers. This multilayer structure is preferably patterned so as to include multiple striped portions extending in a predetermined direction. If each of those striped portions is asymmetric when rotated 180 degrees around an axis that is defined in the predetermined direction, then the upper and lower surfaces of the multilayer structure may have mutually different reflectances. For example, the first grating layer may be used as the uppermost layer of the multilayer structure and another grating layer, which has a lower reflectance than the first grating layer and/or exhibits a light absorbing property, may be used as the lowermost layer. Also, this multilayer structure can be provided on the substrate. By using an optical element with such a multilayer structure in a display device, the contrast can be increased with sufficiently high optical efficiency maintained. This multilayer structure has a thickness of 0.05 µm to 1 µm, which is much thinner than a conventional polarizer.

Alternatively, the first grating layer may be provided on one surface (i.e., surface I) of the substrate, while the second grating layer may be provided on the other surface (i.e., surface II) of the substrate. In that case, the optical reflectances can be controlled independently on the surfaces I and II of the substrate. Such an optical element can be obtained by forming thin films of the first and second materials on the surfaces I and II of the substrate, respectively, and then patterning those thin films separately. Since the patterning process is carried out separately on one of the two surfaces after another, the patterning precision can be increased and high optical performance, represented by various values that are quite close to those calculated during the optical design, is achieved easily. Furthermore, since there is no need to align the striped portions of the first grating layer with the counterparts of the second grating layer, the load on the manufacturing process can be lightened.

Figure 1B:
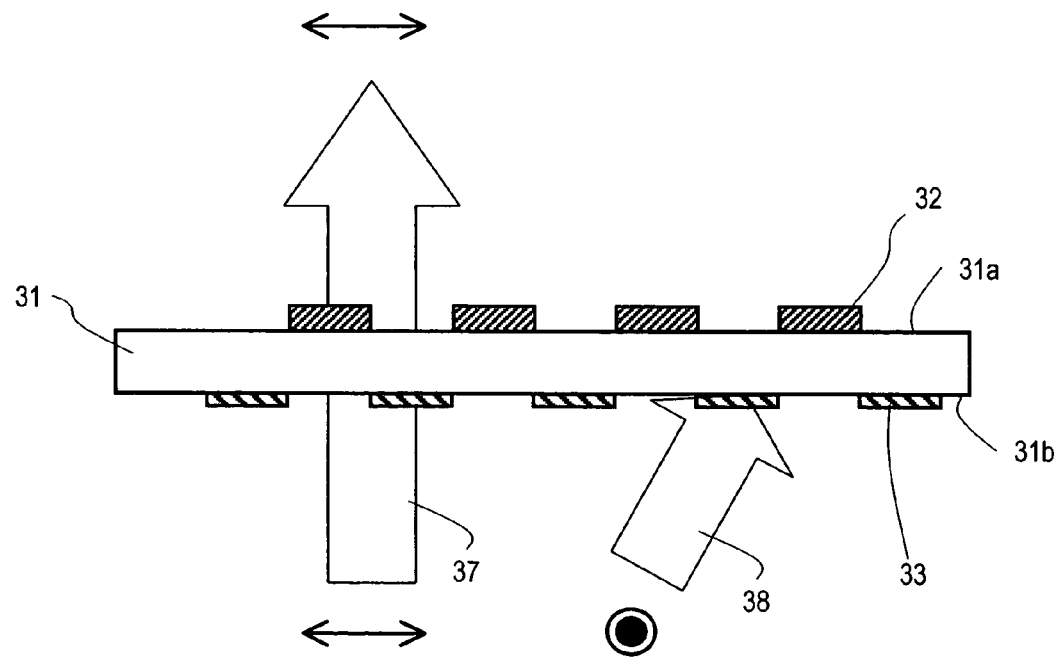

Hereinafter, it will be described with reference to the accompanying drawings why there is no need to align the striped portions of the first grating layer with those of the second grating layer. FIGS. 1A and 1B illustrate a polarizing optical element in which a first grating layer 32 of a reflective metal is provided on surface I 31a of a substrate 31 and in which a second grating layer 33 of a light absorptive material is provided on surface II 31b of the substrate 31. In this example, no alignment is carried out between the striped portions of the first grating layer 32 and those of the second grating layer 33. However, all striped portions of these two grating layers 32 and 33 extend in the same direction. Also, the line widths of the first and second grating layers 32 and 33 are supposed to be sufficiently smaller than the wavelengths of visible radiation (e.g., less than a quarter of the wavelengths of visible radiation, or less than 100 nm).

First, it will be described with reference to FIG. 1A how light coming from over surface I 31a of the substrate 31 is reflected or transmitted.

When a polarized visible light ray (TE wave) 36 having an electric vector that oscillates parallel to the striped portions of the first and second grating layers 32 and 33 is incident on the polarizing optical element from over surface I 31a of the substrate 31, most of the TE wave 36 is reflected from the first grating layer 32 on surface I 31a of the substrate 31 and does not reach surface II 31b of the substrate 31. On the other hand, when a TM wave 35 having an electric vector that oscillates perpendicularly to the striped portions of the first and second grating layers 32 and 33 is incident on the polarizing optical element from over surface I 31a of the substrate 31, the TM wave 35 does not recognize, but passes, the first grating layer 32, is transmitted through the substrate 31 and then reaches surface II 31b of the substrate 31. In this case, the TM wave 35 is a linearly polarized light ray that is also parallel to the striped portions of the second grating layer 33 and therefore does not recognize, but passes, the second grating layer 32, either. Accordingly, no matter whether or not the striped portions of the first grating layer 32 are aligned with those of the second grating layer 33, most of the TM wave 35 is transmitted through this polarizing optical element.

Next, it will be described with reference to FIG. 1B how about the light coming from under surface II 31b of the substrate 31.

When a polarized visible light ray (TE wave) 38 having an electric vector that oscillates parallel to the striped portions of the first and second grating layers 32 and 33 is incident on the polarizing optical element from under surface II 31b of the substrate 31, most of the TE wave 38 is absorbed into the second grating layer 33, while a portion of the TE wave 38 is not absorbed into the second grating layer 33 but reaches surface I 31a of the substrate 31. Thereafter, most of the TE wave 38 having reached surface I 31a of the substrate 31 is reflected from the first grating layer 32 and then absorbed into the second grating layer 33 again on surface II 31b of the substrate 31. On the other hand, when a polarized visible light ray (TM wave) 37 having an electric vector that oscillates perpendicularly to the striped portions of the first and second grating layers 32 and 33 is incident on the polarizing optical element from under surface II 31b of the substrate 31, the TM wave 37 does not recognize, but passes, the second grating layer 33, is transmitted through the substrate 31 and then reaches surface I 31a of the substrate 31. In this case, the TM wave 37 is a linearly polarized light ray that is also parallel to the striped portions of the first grating layer 32 and therefore does not recognize, but passes, the first grating layer 32, either. Accordingly, no matter whether or not the striped portions of the first grating layer 32 are aligned with those of the second grating layer 33, most of the TM wave 37 is transmitted through this polarizing optical element.

In this manner, the reflective first grating layer 32 provided on surface I 31a of the substrate 31 and the absorptive second grating layer 33 provided on surface II 31b of the substrate 31 function independent of each other. Thus, there is no need to align the striped portions of these grating layers 32 and 33 with each other.

In the illustrated example, the first and second grating layers 32 and 33 are supposed to have simple striped shapes. However, these grating layers 32 and 33 just need to have a structure that exhibits some anisotropy on a plane of the substrate 31. For example, each of these grating layers 32 and 33 may consist of unit portions, each of which has a length equal to or greater than the wavelength of light in a certain direction (i.e., in the major axis direction) and a width sufficiently shorter than the wavelength of light in the minor-axis direction that is perpendicular to the major-axis direction. Also, the structure of one grating layer 32 may be different from that of the other grating layer 33. It should be noted that irrespective of the structure of the grating layers 32 and 33, the grating patterns of these grating layers 32 and 33 do not have to be matched to each other with the substrate 31 interposed between them.

Optionally, after these grating layers have been provided on at least one surface of the substrate, the surface(s) of the substrate may be flattened with a transparent layer covering those striped portions. The transparent layer may be made of a dielectric material, for example. Then, a polarizing optical element with a substantially flat surface is obtained and therefore, electrodes, alignment film and other films can be provided on the polarizing optical element more easily. In addition, that transparent layer also functions as a protective coating that protects the grating layers from scratches, for example. As a result, deterioration in the optical property of the polarizing optical element can be minimized.

Hereinafter, preferred embodiments of the present invention will be described with reference to the accompanying drawings, in which any members appearing in multiple sheets but having substantially the same function are identified by the same reference numeral. In the following description, Embodiments 1, 2, 3 and 4 are polarizing optical elements that utilize the antireflection techniques A, B(2), B(3) and B(1), respectively.

Embodiment 1

Figure 2:
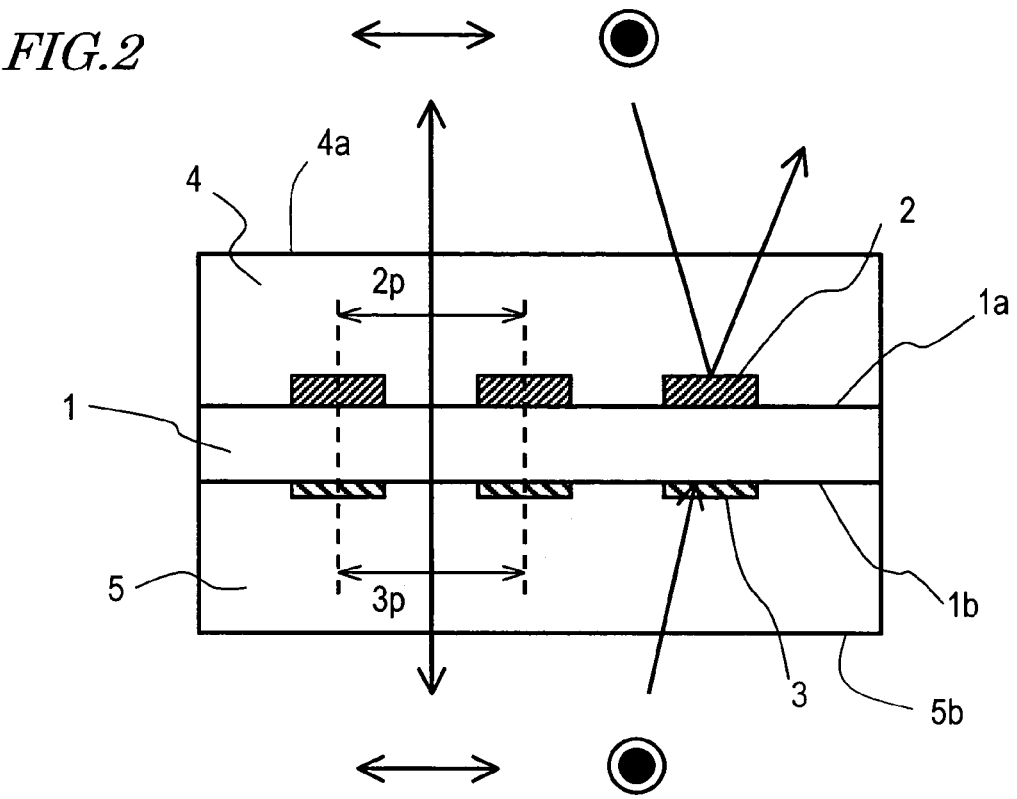
FIG. 2 is a cross-sectional view schematically illustrating a polarizing optical element according to a first specific preferred embodiment of the present invention.

FIG. 2 illustrates a polarizing optical element according to a first specific preferred embodiment of the present invention.

The polarizing optical element of this preferred embodiment preferably includes a substrate 1, a first grating layer 2 with a light reflecting property, which is provided on one surface 1a of the substrate 1, a second grating layer 3, which is provided on the other surface 1b of the substrate 1, and protective coatings 4 and 5, which cover these grating layers 2 and 3, respectively.

The substrate 1 may be made of optically isotropic glass, for example. The first grating layer 2 may be made of an aluminum film with a high light reflecting property and a thickness of 150 nm, for example, and is preferably etched into a grating pattern consisting of multiple lines and spaces. The line width, space width and average grating pitch (2p) may be 80 nm, 70 nm and 150 nm, respectively.

The second grating layer 3 may be made of a tungsten film with a light absorbing property and a thickness of 150 nm, for example, and is preferably etched into a grating pattern consisting of multiple lines and spaces that extend in the same directions as the counterparts of the first grating layer 2. The line width, space width and average grating pitch (3p) may also be 80 nm, 70 nm and 150 nm, respectively.

In this preferred embodiment, there is no need to align the first and second grating layers 2 and 3 with each other so that the striped portions of the second grating layer 3 completely overlap with the counterparts of the first grating layer 2.

The protective coatings 4 and 5, covering the first and second grating layers 2 and 3, respectively, may be made of a photocurable resin with transparency, for example. These protective coatings 4 and 5 are preferably thick enough to prevent the light entering the substrate from causing any thin film interference. The protective coatings 4 and 5 may have a thickness of 500 nm to 5,000 nm (e.g., about 1,000 nm in this preferred embodiment). By providing such protective coatings 4 and 5, it is possible to prevent the grating layers with fine grating patterns from being deteriorated or damaged. Thus, a polarizing optical element with a sufficiently long life can be obtained.

Hereinafter, a method for fabricating this polarizing optical element will be described.

First, a light reflective film such as an aluminum film is deposited on the surface 1a of a substrate 1. Next, the light reflective film is coated with a photoresist so as to be patterned into the grating of those lines and spaces by photolithographic and etching processes. In this preferred embodiment, a fine resist pattern is defined by an interference photolithographic process using a holography and then portions of the light reflective film, which are exposed through the resist pattern, are selectively removed by an ion beam etching process using Ar ions. In this manner, a first grating layer 2 with a very small grating pitch of about 100 nm can be obtained.

Subsequently, the resist pattern is stripped and a transparent photocurable resin is applied onto the entire surface 1*a* of the substrate 1 and then cured by being exposed to a radiation. In this manner, a protective coating 4, which protects the fine-line pattern of the first grating layer 2, can be obtained.

Thereafter, a light absorptive film such as a tungsten film is deposited on the other surface 1*b* of the substrate 1 and then patterned by the same method as that used to pattern the light reflective film. The light absorptive film is etched into a grating pattern consisting of lines and spaces that extend in the same directions as the counterparts of the first grating layer 2. As a result, a second grating layer 3 is formed on the surface 1*b* of the substrate 1. It should be noted that the pattern of the second grating layer 3 needs to have an average grating pitch that is sufficiently shorter than the wavelength of visible radiation and consist of the lines and spaces that extend in the same directions as the counterparts of the first grating layer 2, but does not have to have exactly the same line width and space width as the pattern of the first grating layer 2. That is to say, the second grating layer 3 does not have to be patterned so as to be aligned with the first grating layer 2.

Finally, another protective coating 5 is provided over the second grating layer 3 by the same method as that used to provide the protective coating 4, thereby completing a polarizing optical element.

In this preferred embodiment, the first grating layer 2 is made of a film exhibiting a light reflecting property. Examples of preferred materials for the light reflective film include not only aluminum with good electrical conductivity but also silver, nickel, platinum and alloys thereof. It should be noted that the "light reflective film" or "film with a light reflecting property" means herein that the film has at least the light reflecting property. Thus, the film may also have a light transmitting property and/or a light absorbing property in addition to the light reflecting property.

On the other hand, the second grating layer 3 is made of a light absorptive film. Examples of preferred materials for the light absorptive film include not just tungsten but also chromium, molybdenum, a chromium-molybdenum alloy, carbon black, an iodine complex, a dye or a pigment. Optionally, the light absorptive film may be a thin film including at least two of these materials in combination.

The average grating pitches of the first and second grating layers 2 and 3 may be sufficiently shorter than the wavelength of visible radiation, and preferably 5 nm to 200 nm. In each of these grating layers, the grating pitch does not have to be constant but may have a distribution.

Also, the line widths of the first and second grating layers 2 and 3 are preferably at most about one-fourth of the wavelength of the incoming light.

The first grating layer 2 preferably exhibits a reflectance exceeding 50% with respect to a linearly polarized visible light ray. This is because when the reflectance is greater than 50%, a high contrast ratio is achieved by using this polarizing optical element in a display device.

Optionally, the second grating layer 3 may exhibit a light reflecting property as well as the light absorbing property. In that case, however, the reflectance of the second grating layer 3 is preferably lower than that of the first grating layer 2.

Examples of preferred methods of forming the anisotropic grating pattern include not just the ion beam etching process described above but also various other known fine-line patterning processes. More specifically, a photosensitive resist is applied onto a film to be patterned, and a desired pattern (i.e., a latent image) is defined in the resist layer by a photolithographic process and then subjected to a development process, thereby obtaining a resist mask that serves as an etching mask. Thereafter, portions of the light reflective film, which are not covered with the resist mask, are selectively removed by any of various wet and/or dry etching techniques so as to expose the substrate. Alternatively, instead of performing such a photolithographic process, a resist mask, which has been directly etched into a desired pattern by an electron beam lithographic process, may also be used. Furthermore, the film may also be directly patterned with an electron beam or a laser beam without using any resist mask. Optionally, a replica method or an optical holography method may also be adopted.

In the preferred embodiment described above, each of the first and second grating layers is formed by patterning a single-layer metallic film. However, each of these grating layers just needs to be made of a film with a desired property (i.e., the light reflecting property and/or light absorbing property). Accordingly, the grating layer may be either a single-layer film or a multilayer structure including a metallic material, a semiconductor material and/or a dielectric material. Thus, in patterning each of these films, an appropriate method is preferably selected according to the material and thickness of the light reflective or absorbing film.

The present inventors evaluated the optical properties of a polarizing optical element that was fabricated by the method described above. The results are as follows. When incoming light (with a wavelength of 1,000 nm) was incident on the surface 4*a* of the polarizing optical element over the first grating layer (i.e., aluminum film) 2, the TE wave of the incoming light had a reflectance of 87% and the TM wave thereof had a transmittance of 80%. On the other hand, when incoming light (with a wavelength of 1,000 nm) was incident on the opposite surface 5*b* of the polarizing optical element under the second grating layer (i.e., tungsten film) 3, the TE wave of the incoming light had a reflectance of 31% and the TM wave thereof had a transmittance of 80%. These results reveal that when the light with the wavelength of 1,000 nm was incident on the polarizing optical element of this preferred embodiment, most of the TE wave that had entered the polarizing optical element through the surface 4*a* was reflected from the aluminum film, while the majority of the TE wave that had entered the polarizing optical element through the surface 5*b* was absorbed into the tungsten film. That is to say, the reflection of the TE wave, which had entered the optical element through the surface 5*b*, from the aluminum film was significantly reduced by the tungsten film. It can also be seen that most of the TM wave of the incoming light was transmitted through the gratings of the grating layers 2 and 3 no matter whether the incoming light passed through the surface 4*a* or the surface 5*b*.

As described above, the polarizing optical element of this preferred embodiment is applicable to not just visible light rays but also infrared light rays.

Embodiment 2

Figure 3:
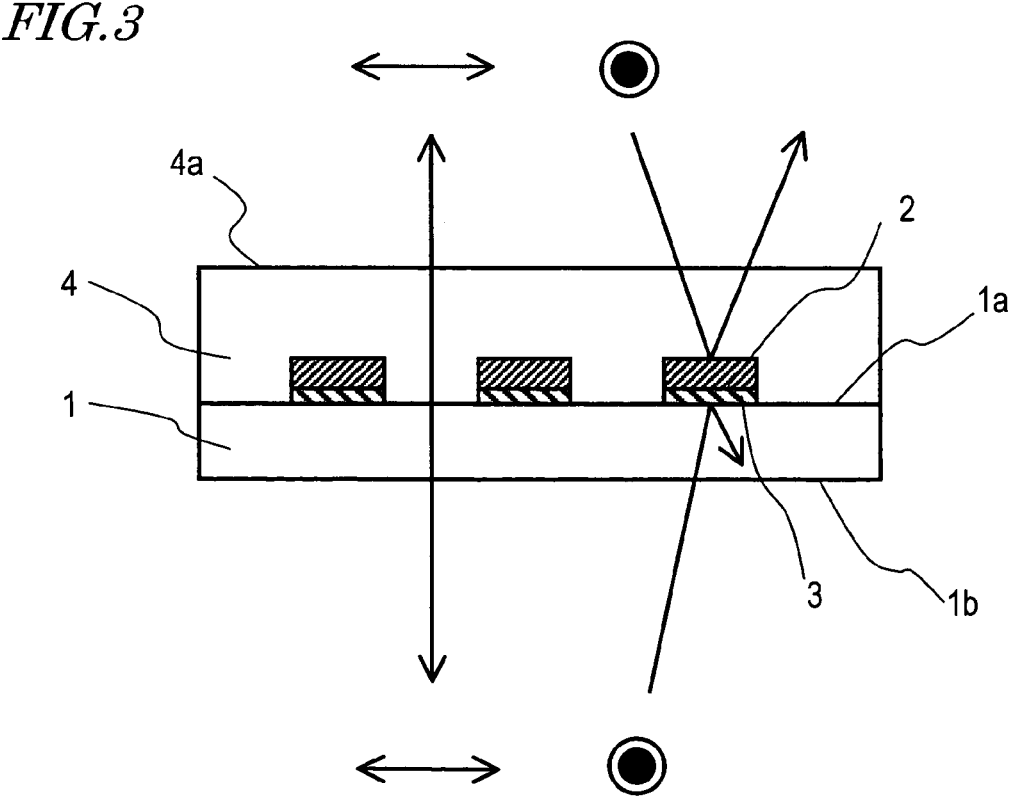
FIG. 3 is a cross-sectional view schematically illustrating a polarizing optical element according to a second specific preferred embodiment of the present invention.

FIG. 3 illustrates a polarizing optical element according to a second specific preferred embodiment of the present invention. The polarizing optical element of this preferred embodiment preferably includes a substrate 1, a second grating layer 3, which is provided on one surface 1a of the substrate 1, a first grating layer 2 with a light reflecting property, which is provided on the second grating layer 3, and a protective coating 4, which covers these grating layers 2 and 3. The substrate 1 may be made of optically isotropic glass, for example. The first grating layer 2 may be made of an aluminum film with a high light reflecting property and a thickness of 150 nm, for example, while the second grating layer 3 may be made of a carbon black film with a light absorbing property and a thickness of 150 nm, for example. The first and second grating layers 2 and 3 are preferably etched into the same grating pattern consisting of multiple lines and spaces. The line width, space width and average grating pitch (2p) may be 80 nm, 70 nm and 150 nm, respectively. The protective coating 4, covering the first and second grating layers 2 and 3, may be made of a photocurable resin with transparency, for example. The protective coating 4 is preferably thick enough to prevent the light entering the substrate from causing any thin film interference. The protective coating 4 may have a thickness of about 1,000 nm.

Hereinafter, a method for fabricating this polarizing optical element will be described.

First, a light absorptive film such as a carbon black film and a light reflective film such as an aluminum film are stacked in this order on the surface 1a of a substrate 1. Next, the light reflective film is coated with a resist, and then these films are etched into a grating pattern (with an average grating pitch of about 150 nm) by an electron beam lithography technique, thereby forming a second grating layer 3 with a light absorbing property and a first grating layer 2 with a light reflecting property. In this preferred embodiment, the stacked light reflective and absorptive films are simultaneously etched with the same resist pattern. Alternatively, the light reflective and absorptive films may be separately patterned by their best methods to be determined by their materials.

Subsequently, the resist pattern is stripped and a transparent photocurable resin is applied onto the entire surface 1a of the substrate 1 and then cured by being exposed to a radiation. In this manner, a protective coating 4, which protects the fine-line patterns of the first and second grating layers 2 and 3, can be obtained, thus completing a polarizing optical element.

In this preferred embodiment, the light reflective and absorptive films do not have to be made of the materials mentioned above but may also be made of various other materials as described above for the first preferred embodiment. The method of patterning these films is not limited to the one mentioned above, either, but may be appropriately selected from various other methods as in the preferred embodiment described above.

The present inventors evaluated the optical properties of a polarizing optical element that was fabricated by the method described above. The results are as follows. When incoming light (with a wavelength of 1,000 nm) was incident on the surface 4a of the polarizing optical element over the first grating layer (i.e., aluminum film) 2, the TE wave of the incoming light had a reflectance of 80% and the TM wave thereof had a transmittance of 78%. On the other hand, when incoming light (with a wavelength of 1,000 nm) was incident on the opposite surface 1b of the polarizing optical element under the second grating layer (i.e., carbon black film) 3, the TE wave of the incoming light had a reflectance of 35% and the TM wave thereof had a transmittance of 78%. These results reveal that when the light with the wavelength of 1,000 nm was incident on the polarizing optical element shown in FIG. 3, most of the TE wave that had entered the polarizing optical element through the surface 4a was reflected from the aluminum film, while the majority of the TE wave that had entered the polarizing optical element through the surface 1b was transmitted through the substrate 1 and then absorbed into the carbon black film. That is to say, the reflection of the TE wave, which had entered the optical element through the surface 1b, from the aluminum film was significantly reduced by the carbon black film. It can also be seen that most of the TM wave of the incoming light was transmitted through the gratings of the grating layers 2 and 3 no matter whether the incoming light passed through the surface 4a or the surface 1b.

Embodiment 3

Figure 4:
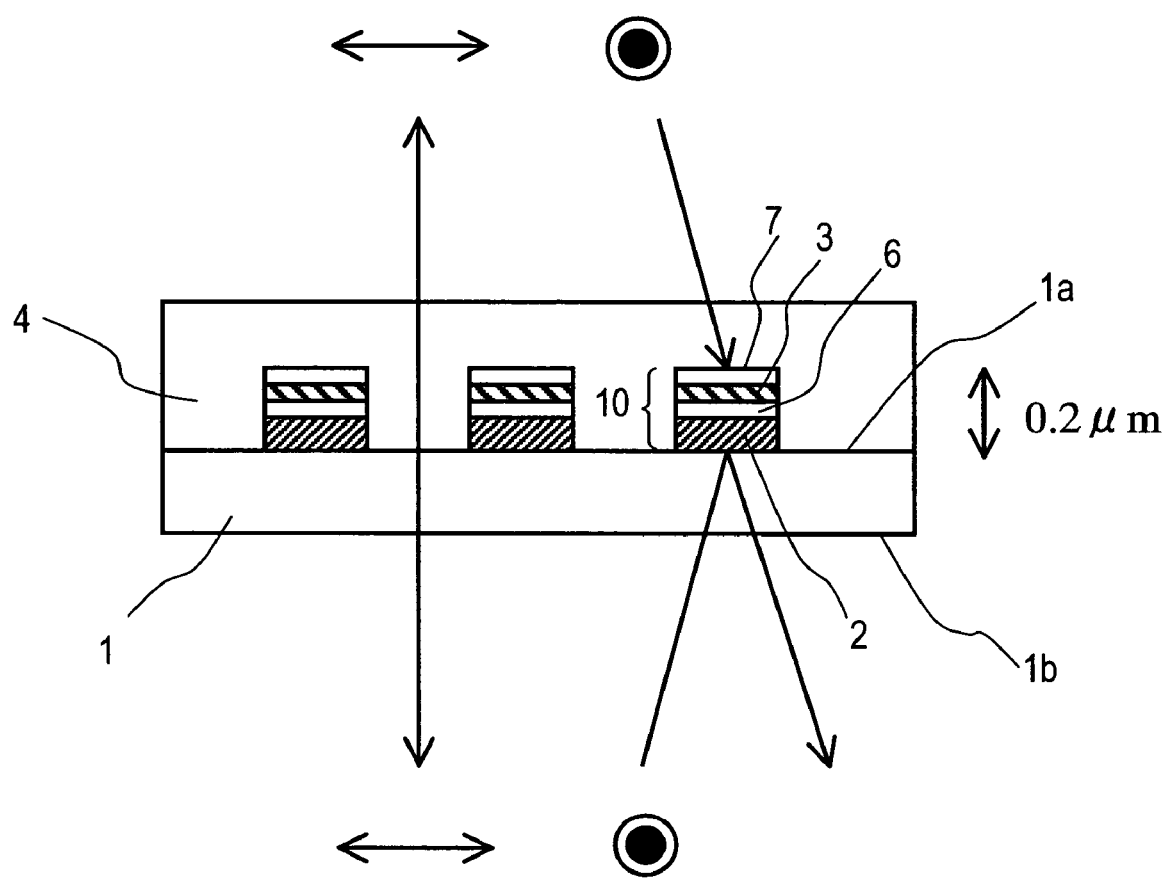
FIG. 4 is a cross-sectional view schematically illustrating a polarizing optical element according to a third specific preferred embodiment of the present invention.

FIG. 4 illustrates a polarizing optical element according to a third specific preferred embodiment of the present invention. The polarizing optical element of this preferred embodiment preferably includes a substrate 1, a multilayer structure 10 provided on one surface 1a of the substrate 1, and a protective coating 4 covering the multilayer structure 10. The substrate 1 may be made of optically isotropic glass, for example. The multilayer structure 10 preferably includes a first grating layer 2 with a light reflecting property, a first dielectric layer 6, a second grating layer 3 and a second dielectric layer 7, which are preferably stacked in this order on the surface 1a of the substrate 1. The first grating layer 2 may be made of a silver (Ag) film with a high light reflecting property and a thickness of 150 nm, while the second grating layer 3 may be made of a tungsten film with a light absorbing property and a thickness of 12.8 nm. The first dielectric layer 6 may be an $SiO_2$ film with a thickness of 66.4 nm, while the second dielectric layer 7 may be a $ZrO_2$ film with a thickness of 114.1 nm. The multilayer structure 10 has been etched into a grating pattern consisting of multiple lines and spaces. The line width, space width and average grating pitch (2p) may be 80 nm, 70 nm and 150 nm, respectively. The protective coating 4, covering the multilayer structure 10, may be made of a photocurable resin with transparency, for example. The protective coating 4 is preferably thick enough to prevent the light entering the substrate from causing any thin film interference. The protective coating 4 may have a thickness of about 1,000 nm, for example.

In this preferred embodiment, the second grating layer 3 and dielectric layers 6 and 7 have antireflection effects. By utilizing not only the absorption of light into the second grating layer 3 but also the thin film interference caused by the dielectric layers 6 and 7 in this manner, reflection of light can be reduced in a broader wavelength range.

Hereinafter, a method for fabricating the polarizing optical element shown in FIG. 4 will be described with reference to FIGS. 8A through 8E.

Figure 8A:
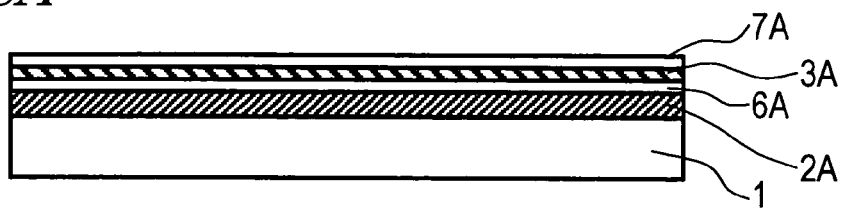
FIGS. 8A through 8F are cross-sectional views schematically illustrating respective process steps for fabricating the polarizing optical element of the third preferred embodiment of the present invention.
Figure 8B:
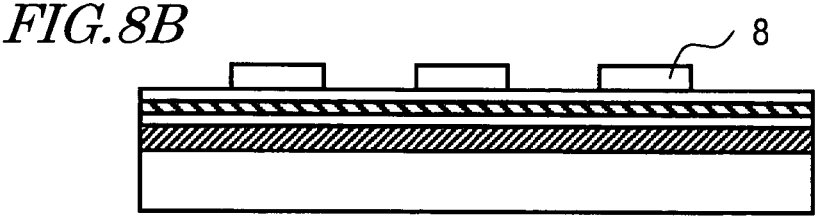
Figure 8C:
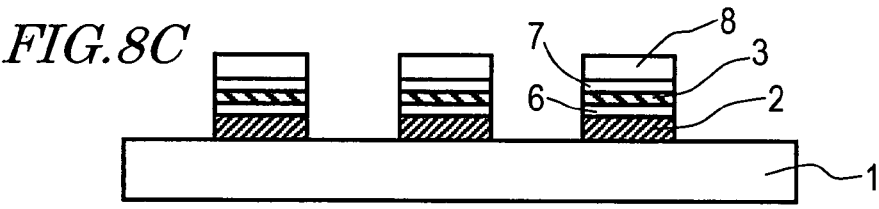
Figure 8D:
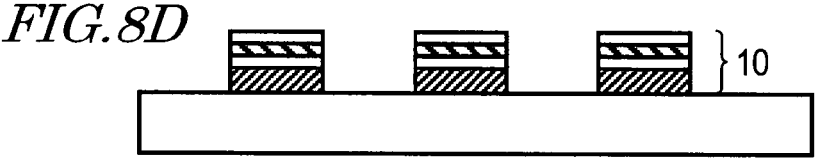
Figure 8E:
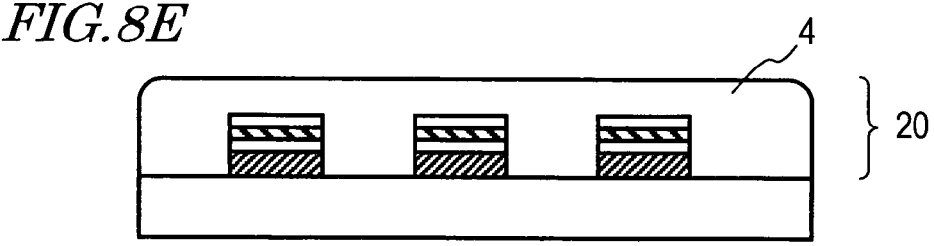

First, as shown in FIG. 8A, a light reflective film (e.g., Ag film) 2A, a dielectric film (e.g., $SiO_2$ film) 6A, a light absorptive film (e.g., W film) 3A and another dielectric film (e.g., $ZrO_2$ film) 7A are stacked in this order on the surface of a substrate 1. Next, as shown in FIG. 8B, a resist pattern 8 is defined on the surface of the $ZrO_2$ film, which is the uppermost layer, and the stack is etched by an electron beam lithography technique into the grating pattern consisting of multiple lines and spaces as shown in FIG. 8C. When the resist pattern 8 is stripped after that, a multilayer structure 10 (with a thickness of about 0.2 μm) can be obtained as shown in FIG. 8D. Thereafter, if necessary, a photocurable resin, which is a transparent dielectric with n of 1.5, is applied onto the entire surface 1a of the substrate 1 and then cured by being exposed to a radiation. In this manner, a protective coating 4, which protects the fine-line grating pattern, can be obtained as shown in FIG. 8E. The protective coating 4 is preferably thick enough to prevent the light entering the substrate from causing any thin film interference. The protective coating 4 may have a thickness of about 1,000 nm, for example. In this manner, a polarizing optical element 20, which is supported on the substrate 1, is completed.

The materials and thicknesses of the respective layers included in the multilayer structure 10 are not limited to those mentioned above. By changing the refractive index or thickness of any of these layers, the reflectance of the light that has entered the polarizing optical element through the surface 4a (i.e., from over the multilayer structure 10), the reflectance of the light that has entered the polarizing optical element through the surface 1b of the substrate 1 and the reflectance dichroic ratio thereof can be controlled. For example, by increasing the thickness of the first grating layer 2, the optical reflectance of the first grating layer 2 can be increased and therefore, the TE wave, which has entered the polarizing optical element through the surface 1b (i.e., from under the first grating layer 2 of the multilayer structure 10), can be reflected at a higher reflectance. More specifically, to achieve sufficiently high reflectance, the Ag film preferably has a thickness of at least 50 nm. If the Ag film has a thickness of 50 nm or more, then the TE wave, which has entered the polarizing optical element through the surface 1b, can be reflected at a higher reflectance, and the light passing through the surface 1b can have increased reflectance dichroic ratio. In addition, the contrast ratio (or the ratio of the reflectances) of the light passing through the surface 4a of the polarizing optical element to the light passing through the surface 1b can also be increased. If necessary, any of these layers of the multilayer structure 10 may be made of a material with birefringence. Also, the number of the layers included in the multilayer structure 10 does not have to be four but may be five or more.

In this preferred embodiment, the multilayer structure 10 preferably has a thickness of 0.05 μm to 1 μm. Thus, the polarizing optical element of this preferred embodiment can be much thinner than a conventional polarizer.

Figure 6:
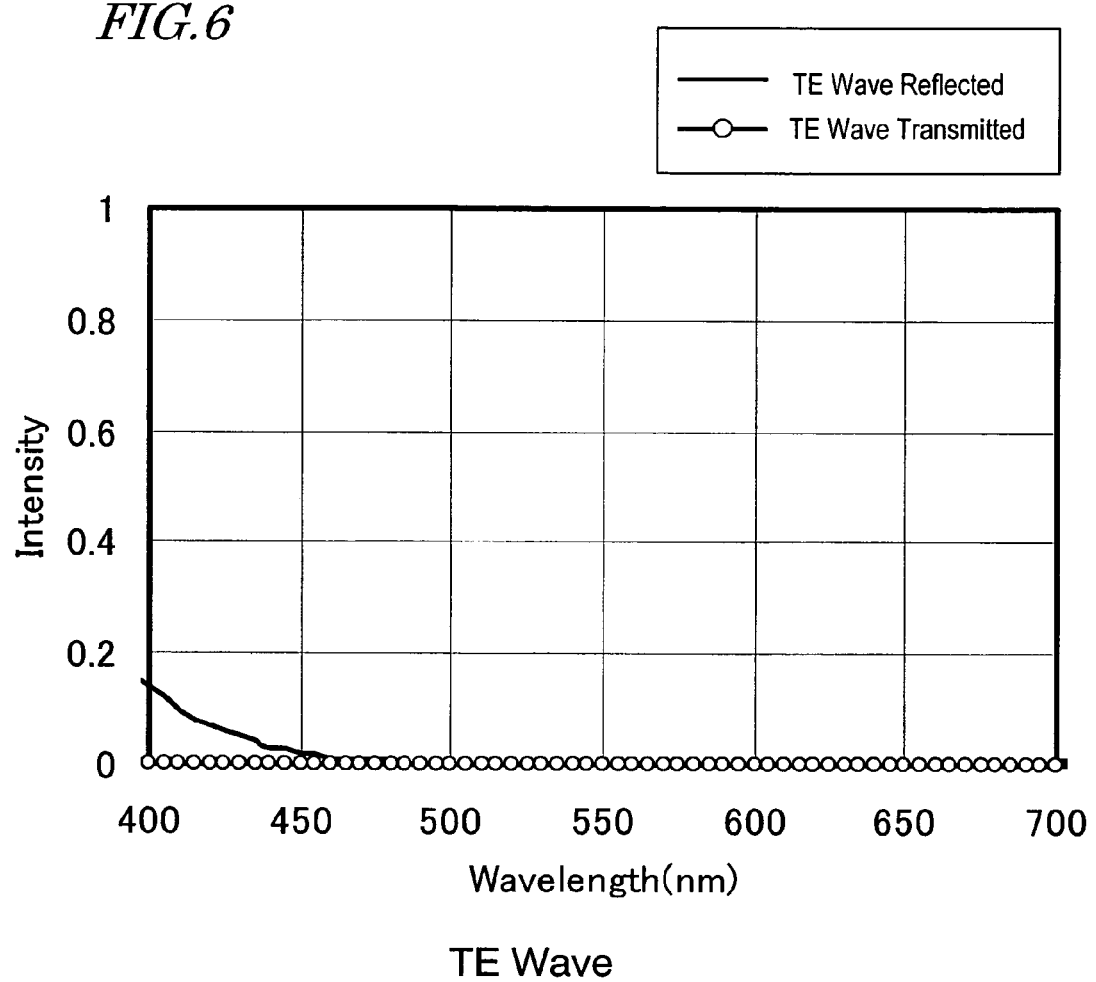
FIG. 6 is a graph showing what optical property the polarizing optical element of the third preferred embodiment of the present invention exhibits with respect to a TE wave that has entered the optical element from behind the substrate on which a multilayer structure is provided.
Figure 7:
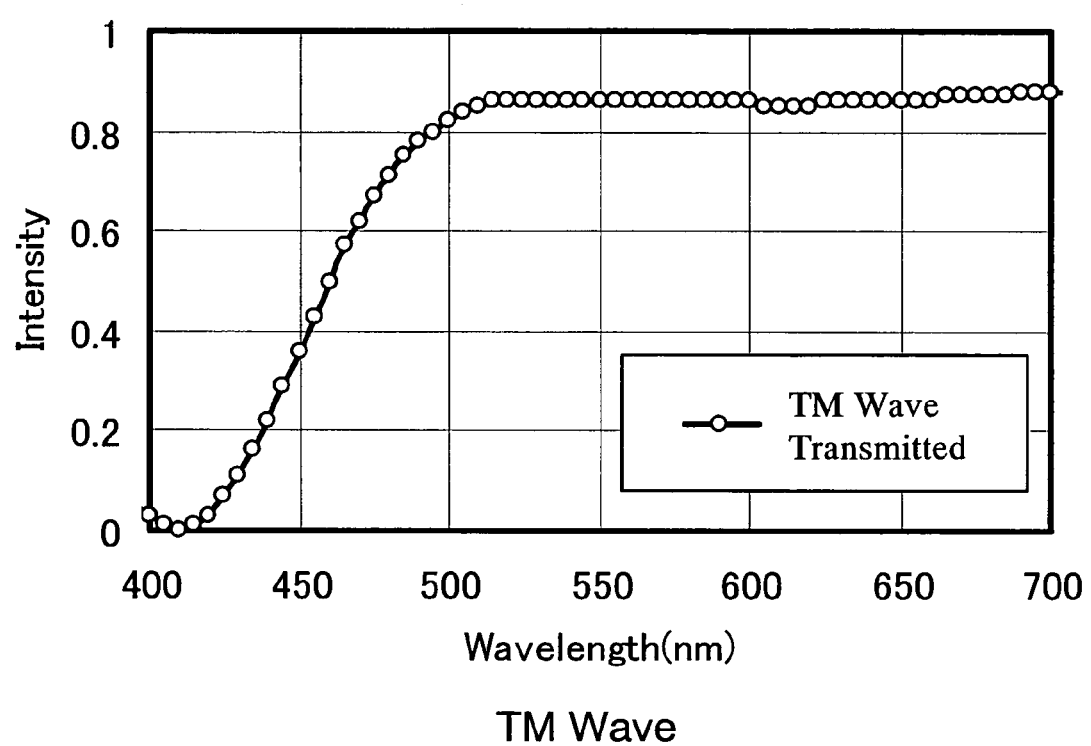
FIG. 7 is a graph showing what optical property the polarizing optical element of the third preferred embodiment of the present invention exhibits with respect to a TM wave.

The present inventors obtained the reflectance and transmittance spectra of respective polarized light rays entering a polarizing optical element that had been made by the method described above. The reflectances and transmittances were measured before the protective coating 4 was formed. The results are shown in FIGS. 5, 6 and 7.

Figure 5:
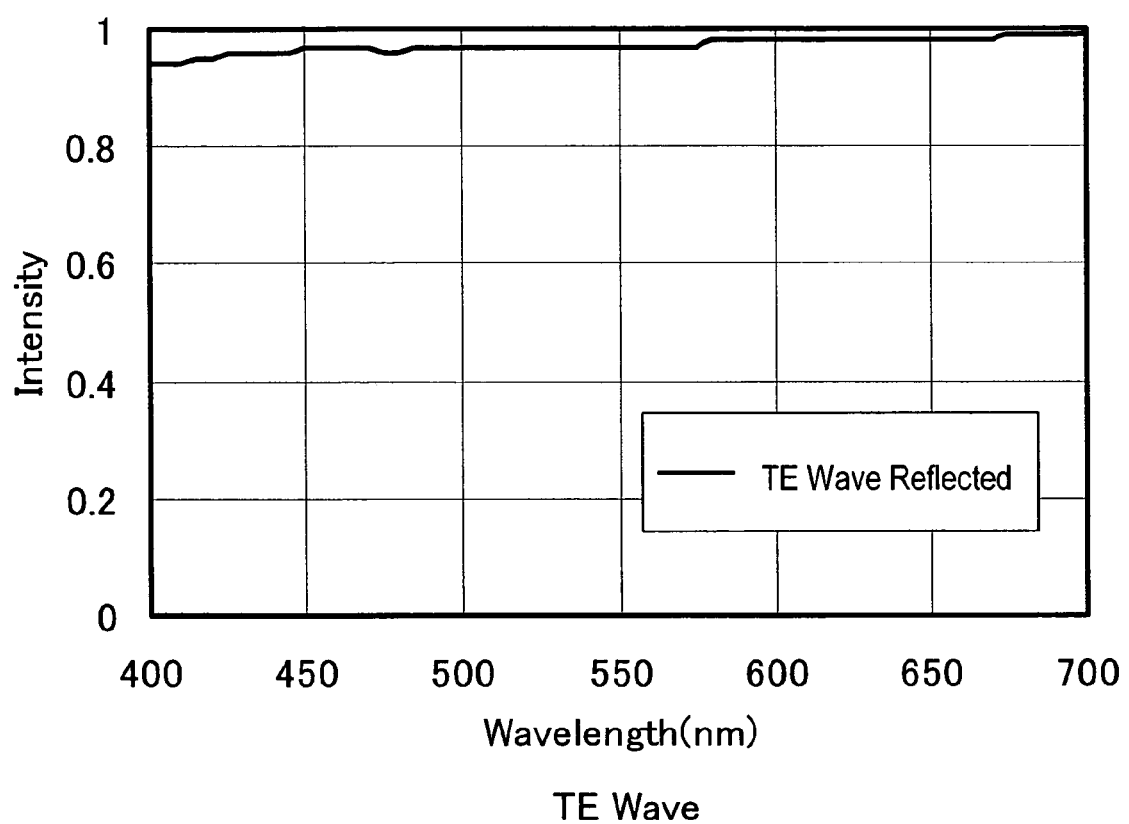
FIG. 5 is a graph showing what optical property the polarizing optical element of the third preferred embodiment of the present invention exhibits with respect to a TE wave that has entered the optical element from over the protective coating thereof.

FIG. 5 is a graph showing how the reflectance changes with the wavelength of the TE wave entering the polarizing optical element through the surface 1b of the substrate. In FIG. 5, the reflectance of the TE wave is mainly controlled by the first grating layer 2. FIG. 6 is a graph showing how the reflectance and transmittance change with the wavelength of the TE wave entering the polarizing optical element through the surface 1a of the substrate. As can be seen from FIG. 6, the reflection of the TE wave is minimized in a broad wavelength range. Since the transmittance is also appropriately equal to zero, most of the incoming TE wave would have been absorbed into the second grating layer 3. It will be described why this multilayer structure 10 has such antireflection effects. Generally speaking, in a multilayer structure including reflective and absorptive layers, antireflection effects are achieved by adjusting the optical admittances of these layers. In this preferred embodiment, the first grating layer 2 of Ag is a reflective layer, the second grating layer 3 of W is an absorptive layer, the dielectric layer 6 of $SiO_2$ controls the optical admittance between the reflective and absorptive layers, and the dielectric layer 7 of $ZrO_2$ controls the optical admittance between the absorptive layer and the air. FIG. 7 is a graph showing how the transmittance of the TW wave, entering the polarizing optical element through the surfaces 1a and 1b, changes with the wavelength. Based on these spectra, the optical properties of the polarizing optical element may be calculated as follows.

When light with a single wavelength of 539 nm entered the polarizing optical element through the surface 1b of the substrate 1, the TE wave of the incoming light had a reflectance of 94% and the TM wave thereof had a transmittance of 82%. On the other hand, when light with a single wavelength of 539 nm entered the polarizing optical element through the surface 1a of the substrate 1 (i.e., from over the multilayer structure 10), the TE wave of the incoming light had a reflectance of 1% and the TM wave thereof had a transmittance of 82%. These results reveal that when the light with a wavelength of 539 nm entered the polarizing optical element, most of the TE wave passing the surface 1b was transmitted through the substrate 1 and then reflected from the first grating layer 2 of Ag, while the majority of the TE wave passing the surface 1a was transmitted through the $ZrO_2$ film and then absorbed into the second grating layer 3 of tungsten. That is to say, the reflection of the TE wave, which had passed through the surface 1a, from the Ag film was reduced significantly by the tungsten film. It can also be seen that most of the TM wave of the incoming light was transmitted through the gratings of the multilayer structure 10 no matter whether the light passed through the surface 1a or the surface 1b.

When visible light rays with wavelengths of 380 nm to 780 nm entered the polarizing optical element, the TE wave entering the polarizing optical element through the surface 1b of the substrate 1 had an average reflectance of 91% while the TM wave entering that way had an average transmittance of 75%. On the other hand, the TE wave entering the polarizing optical element through the surface 1a of the substrate 1 had an average reflectance of 3% while the TM wave entering that way had an average transmittance of 75%. These results reveal that the polarizing optical element of this preferred embodiment exhibits excellent optical properties not just at a particular wavelength but also in a broad visible radiation range of 380 nm to 780 nm.

Embodiment 4

A polarizing optical element according to a fourth specific preferred embodiment of the present invention has almost the same configuration as the counterpart of the second preferred embodiment shown in FIG. 3. However, the polarizing optical element of this preferred embodiment uses a transparent dielectric film as the second grating layer 3.

In the polarizing optical element of this preferred embodiment, the second grating layer 3 is a transparent dielectric layer with an extinction coefficient k=0. The transparent dielectric layer may be a titanium oxide film with a thickness of 25 nm, for example. Also, in this preferred embodiment, the first grating layer 2 is a metallic film with electrical conductivity and light reflecting property (e.g., a tungsten film with a thickness of 150 nm) as in the second preferred embodiment described above. These grating layers 2 and 3 have been etched into a grating pattern with a line width of 100 nm, a space width of 100 nm and a grating pitch of 200 nm, for example. Also, these grating layers 2 and 3 are covered with a protective coating 4 with a thickness of about 1,000 nm.

The polarizing optical element of the fourth preferred embodiment may be fabricated by the same method as used to make the polarizing optical element of the second preferred embodiment described above.

First, a transparent film such as a titanium oxide film and a light reflective film such as a tungsten film are stacked in this order on the surface 1a of a substrate 1. Next, the light reflective film is coated with a resist by a photolithographic process, and then these films are etched into a grating pattern (with an average grating pitch of about 200 nm) by an Ar sputtering process, thereby forming a second grating layer 3 with transparency and a first grating layer 2 with a light reflecting property. Subsequently, the resist pattern is stripped and a protective coating 4 is formed over the entire surface 1a of the substrate 1 by the same method as that described for the second preferred embodiment.

In this preferred embodiment, the light reflective and transparent films do not have to be made of the materials mentioned above but may also be made of various other materials as described above for the first preferred embodiment. The method of patterning these films is not limited to the one mentioned above, either, but may be appropriately selected from various other methods as in the preferred embodiment described above.

The present inventors evaluated the optical properties of a polarizing optical element that was fabricated by the method described above. The results are as follows. When incoming light (with a wavelength of 530 nm) was incident on the surface 4a of the polarizing optical element over the first grating layer (i.e., tungsten film) 2, the TE wave of the incoming light had a reflectance of 37% and the TM wave thereof had a transmittance of 87%. On the other hand, when incoming light (with a wavelength of 530 nm) was incident on the opposite surface 1b of the polarizing optical element under the second grating layer (i.e., titanium oxide film) 3, the TE wave of the incoming light had a reflectance of 2% and the TM wave thereof had a transmittance of 87%. In this preferred embodiment, the TE wave passing through the surface 1b is transmitted through the substrate 1 and the titanium oxide film and then partially absorbed into, but mostly reflected from, the tungsten film. The reflected light is weakened due to the thin film interference between the titanium oxide film and the tungsten film, and does not goes out of the surface 1b. That is to say, the reflection of the TE wave, which had entered the optical element through the surface 1b, from the tungsten film was significantly reduced by the titanium oxide film. It can also be seen that most of the TM wave of the incoming light was transmitted through the gratings of the grating layers 2 and 3 no matter whether the incoming light passed through the surface 4a or the surface 1b.

Embodiment 5

A fifth specific preferred embodiment of the present invention is a transflective liquid crystal display device including the polarizing optical element of the third preferred embodiment described above. Compared with using light with a single wavelength, the polarizing optical element of the third preferred embodiment results in a somewhat lower contrast ratio as described above. However, depending on its optical design, the polarizing optical element can also exhibit in a broad visible radiation range as good optical properties as those achieved by the single wavelength. Accordingly, this polarizing optical element may be used as a polarizer for a display device.

Hereinafter, a configuration for a transflective liquid crystal display device including the polarizing optical element of the third preferred embodiment described above and a method for fabricating the display device will be described.

First, a polarizing optical element 20 is fabricated by the method that has already been described for the third preferred embodiment with reference to FIGS. 8A through 8E. The polarizing optical element 20 is coated with a transparent insulating protective coating (i.e., a passivation film) 4.

Figure 8F:
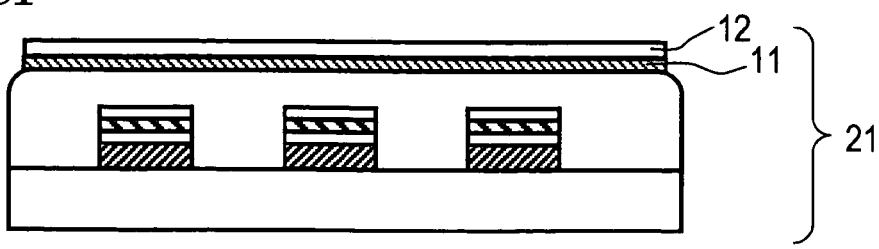

Next, as shown in FIG. 8F, a transparent electrode 11 is formed on the protective coating 4 of the polarizing optical element 20 and then the surface of the transparent electrode 11 is coated with an alignment film 12. Then, the alignment film 12 is subjected to a rubbing treatment, thereby obtaining a first substrate 21 for a liquid crystal display device.

Subsequently, a second substrate 22 to face the first substrate 21 is prepared. Just like the first substrate 21, the second substrate 22 is also obtained by providing a transparent electrode 11 and an alignment film 12 on the surface of a transparent substrate so that the alignment film 12 will face a liquid crystal layer and then by subjecting the alignment film 12 to a rubbing treatment.

Thereafter, spacers are dispersed between the first and second substrates 21 and 22 so as to create and maintain a gap of several μm there and then the first and second substrates 21 and 22 are bonded together such that the rubbing directions of their alignment films 12 are perpendicular to each other to make up a cell. Subsequently, the cell is sealed up with a sealing agent. Finally, a liquid crystal material is injected into this cell, thereby completing a liquid crystal cell 24 including a liquid crystal layer 23. In the liquid crystal layer 23, liquid crystal molecules have TN orientations.

Figure 9:
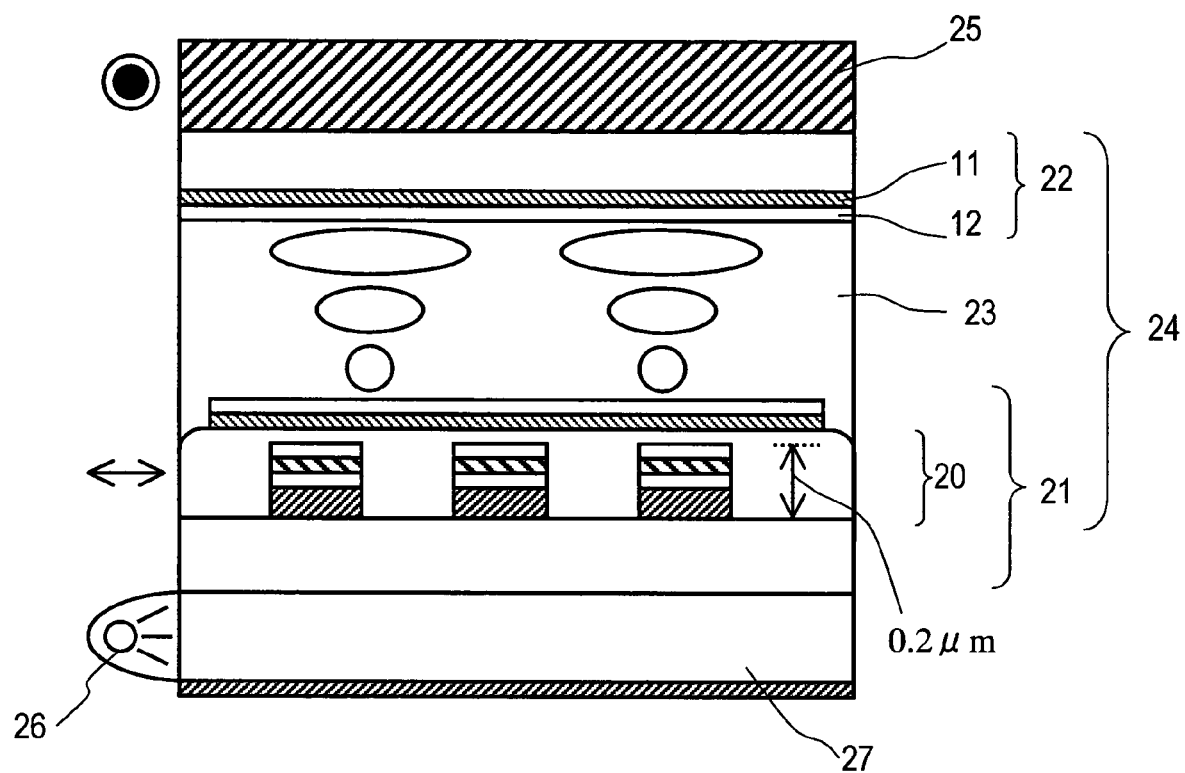
FIG. 9 is a cross-sectional view schematically illustrating a transflective liquid crystal display device according to a fifth specific preferred embodiment of the present invention.

FIG. 9 is a cross-sectional view schematically illustrating a configuration for a transflective liquid crystal display device including the liquid crystal cell 24. As shown in FIG. 9, an absorptive polarizer 25 is provided on one surface of the liquid crystal cell 24 so as to be located closer to the viewer than the liquid crystal cell 24 is. The absorptive polarizer 25 is bonded such that its transmission axis crosses that of the polarizing optical element 20 in the first substrate 21 at right angles. Also, a backlight 26 and an optical waveguide 27 are provided behind the liquid crystal cell 24.

Figure 10A:
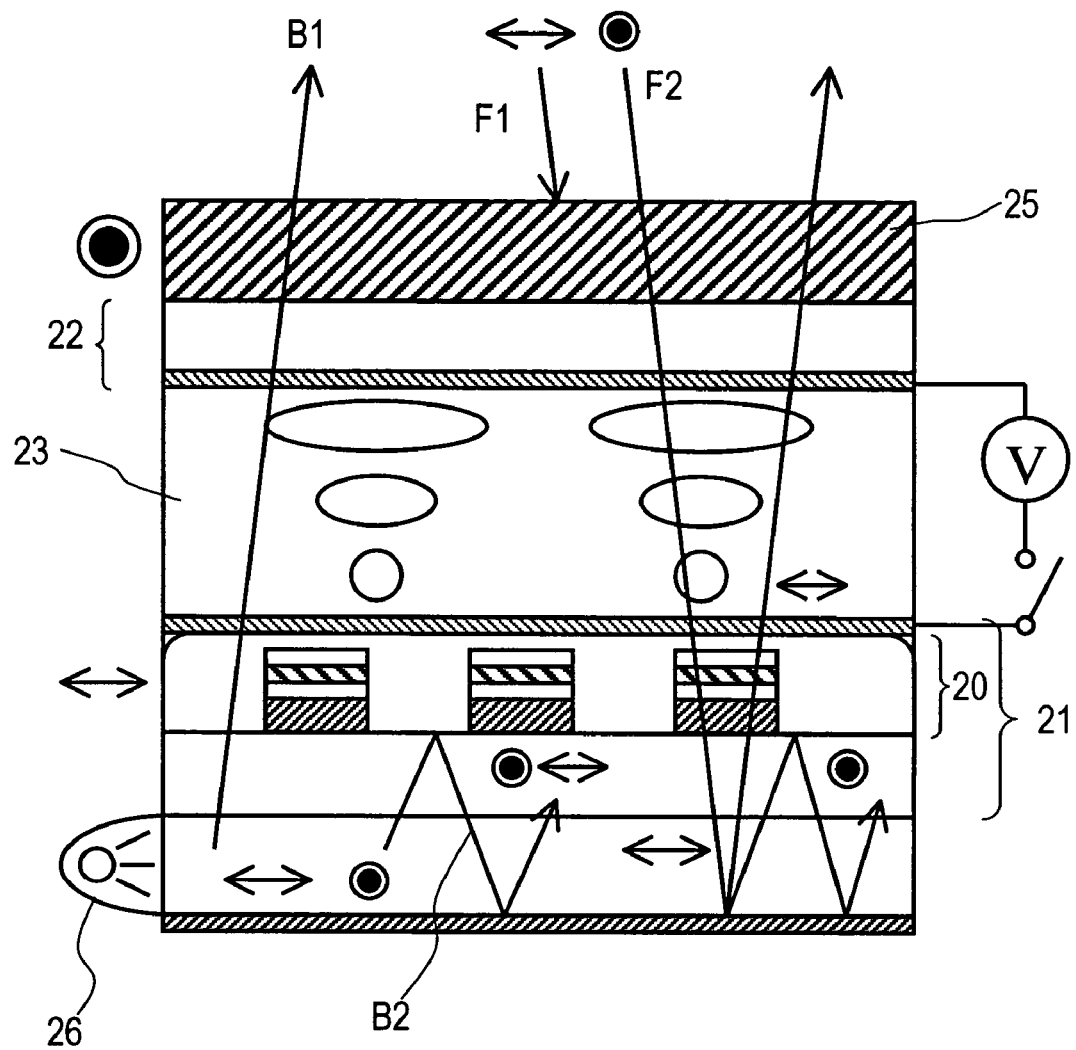
FIG. 10A is a cross-sectional view schematically illustrating how the polarizing optical element operates in the transflective liquid crystal display device of the fifth preferred embodiment of the present invention while no electric field is being applied to the liquid crystal layer thereof.
Figure 10B:
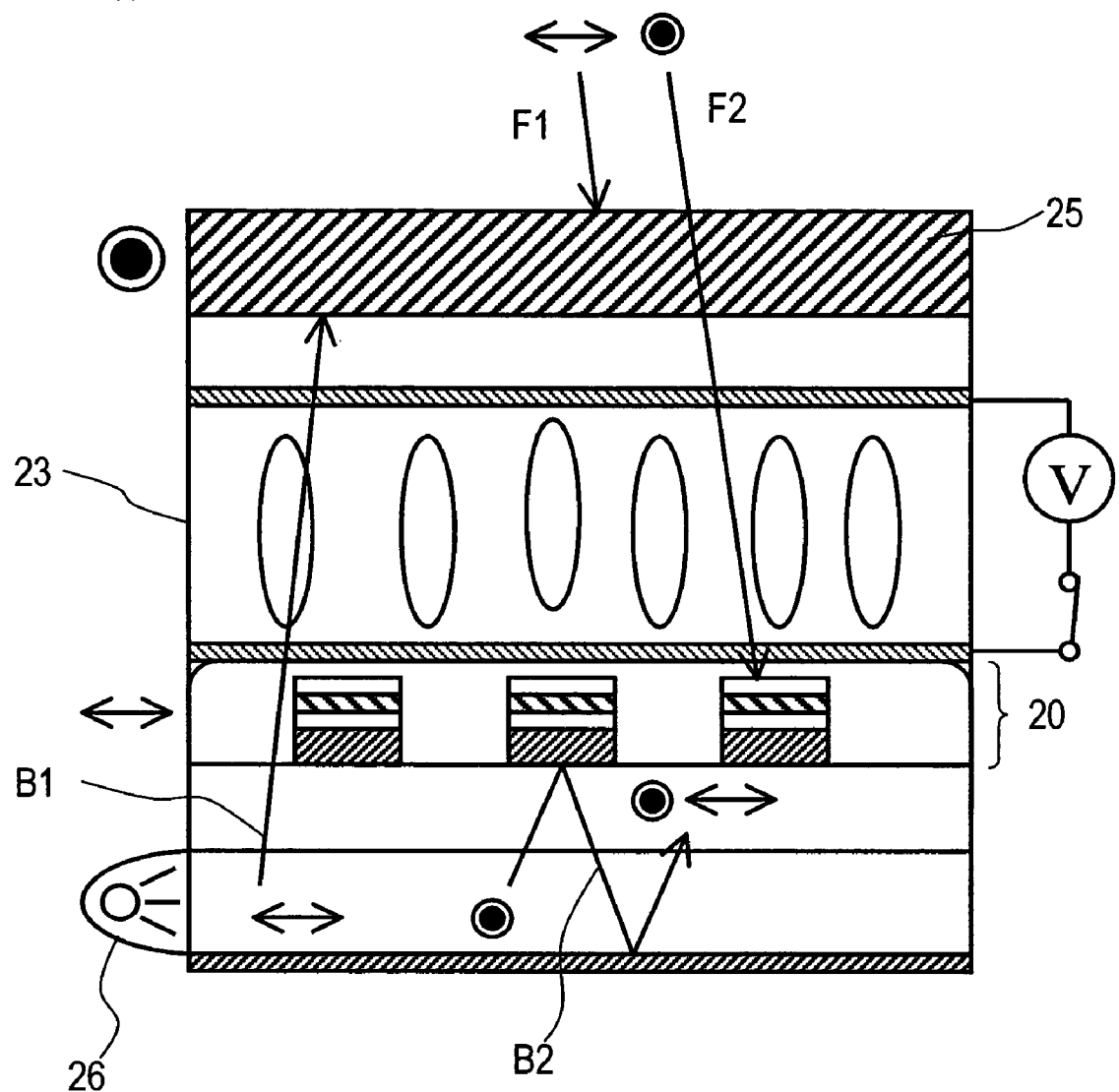
FIG. 10B is a cross-sectional view schematically illustrating how the polarizing optical element operates in the transflective liquid crystal display device of the fifth preferred embodiment of the present invention while an electric field is being applied to the liquid crystal layer thereof.

Hereinafter, the operating principle of the display device shown in FIG. 9 will be described. FIG. 10A schematically illustrates how the display device creates a bright display state while no electric field is being applied to the liquid crystal layer 23. On the other hand, FIG. 10B schematically illustrates how the display device creates a dark display state while an electric field is being applied to the liquid crystal layer 23.

First, it will be described with reference to FIG. 10A how the display device creates a bright display state while no electric field is being applied to the liquid crystal layer 23.

In the transmission display mode, the backlight 26 is used as the light source to emit light rays in various polarization states toward the liquid crystal cell 24. Among these incoming light rays, a linearly polarized light ray B1, of which the polarization direction is parallel to the transmission axis of the polarizing optical element 20 in the first substrate 21, is transmitted through the polarizing optical element 20 and then has its polarization direction rotated 90 degrees by the TN liquid crystal layer 23. Thereafter, the linearly polarized light ray B1 is also transmitted through the absorptive polarizer 25 toward the viewer, thus creating a bright state in the transmission mode. Among other outgoing light rays of the backlight 26, a linearly polarized light ray B2, of which the polarization direction crosses that of the linearly polarized light ray B1 at right angles, is repeatedly reflected by (the first grating layer) of the polarizing optical element 20 and by a reflective layer 30 provided on the back of the optical waveguide 27, and then recycled as the case may be.

In the reflection display mode on the other hand, external light is used as the light source, and light rays in various polarization states enter the liquid crystal cell 24 as in the transmission display mode. Among these incoming light rays, a linearly polarized light ray F1, of which the polarization direction is parallel to the transmission axis of the absorptive polarizer 25 in the second substrate 22, is transmitted through the absorptive polarizer 25 and then has its polarization direction rotated 90 degrees by the TN liquid crystal layer 23. Thereafter, the linearly polarized light ray F1 is transmitted through the polarizing optical element 20 of the first substrate 21 and then reflected from the reflective layer 30 on the back of the optical waveguide 27. As in the previous course, the reflected linearly polarized light ray F1 is again transmitted through the polarizing optical element 20, has its polarization direction rotated by the TN liquid crystal layer, and then is transmitted through the absorptive polarizer 25 so as to be directed toward the viewer. As a result, a bright state is also realized in the reflection mode. However, among other externally incoming light rays, a linearly polarized light ray F2, of which the polarization direction crosses that of the linearly polarized light ray F1 at right angles, is absorbed into the absorptive polarizer 25 in the second substrate 22 and therefore does not contribute to the display operation.

Next, it will be described with reference to FIG. 10B how the display device creates a dark display state while an electric field is being applied to the liquid crystal layer 23.

In the transmission display mode, among the light rays emitted from the backlight 26 as a light source, a linearly polarized light ray B1, of which the polarization direction is parallel to the transmission axis of the polarizing optical element 20 in the first substrate 21, is transmitted through the polarizing optical element 20 but cannot be transmitted through the absorptive polarizer 25 facing the viewer. This is because the liquid crystal layer 23 to which an electric field is being applied maintains the polarization state of the incoming light ray. Thus, a dark state is created in the transmission mode. Among other outgoing light rays of the backlight 26, a linearly polarized light ray B2, of which the polarization direction crosses that of the linearly polarized light ray B1 at right angles, is reflected by the polarizing optical element 20 and does not contribute to the display operation directly.

In the reflection display mode on the other hand, among the external light rays as a light source, a linearly polarized light ray F1, of which the polarization direction is parallel to the transmission axis of the absorptive polarizer 25 in the second substrate 22, is transmitted through the absorptive polarizer 25 and the liquid crystal layer 23 and then absorbed into the polarizing optical element 20 in the first substrate 21. As a result, a dark state is also realized in the reflection mode. However, among other externally incoming light rays, a linearly polarized light ray F2, of which the polarization direction crosses that of the linearly polarized light ray F1 at right angles, is absorbed into the absorptive polarizer 25 in the second substrate 22 and therefore does not contribute to the display operation directly.

As described above, by using the polarizing optical element 20 of the third preferred embodiment as a polarizer for a liquid crystal display device, the display contrast can be maintained, and either the outgoing light ray of the backlight 26 or the external light can be used effectively, thus realizing the display of a bright and high-contrast image.

In a conventional liquid crystal display device, either a polarizer (with a thickness of 100 μm, for example) or a polarizer unit (with a thickness of 300 μm, for example) is provided between the first substrate 21 and the backlight 26. In contrast, in this preferred embodiment, the polarizing optical element 20 is included in the first substrate 21 of the liquid crystal display device, and therefore, the required thickness of the polarizer for the first substrate 21 is substantially equal to the thickness of the multilayer structure 10 (about 0.2 μm). Even if the protective coating 4 is provided so as to cover the multilayer structure 10, the required thickness is still equal to only the thickness of the protective coating 4 (e.g., 1 μm). Consequently, the thickness of the liquid crystal display device of this preferred embodiment can be much smaller than that of the conventional liquid crystal display device.

The operating principle of the display device has been described above with reference to FIGS. 10A and 10B on the supposition that even after having been reflected from the reflective layer 30 behind the optical waveguide 27, each light ray maintains its polarization state. Accordingly, if the display device is designed so as to change the polarization state of a light ray upon the reflection from the reflective layer 30 either by providing a phase film between the liquid crystal layer and the reflective layer or by getting the light diffused broadly by the reflective layer 30, then a portion of the linearly polarized light ray B2 that has been reflected from the reflective layer 30 can transmit the polarizing optical element 20 in the first substrate 21. As a result, the linearly polarized light ray B2 emitted from the backlight 26 can be recycled more efficiently. However, if the reflective layer 30 is modified in this manner, then a portion of the externally incoming linearly polarized light ray F1 cannot be transmitted through the polarizing optical element 20 and cannot contribute to the display operation anymore after having been reflected from the reflective layer 30. That is to say, some loss is caused in the linearly polarized light ray F1. Thus, by controlling the effects of the reflective layer 30 on the polarization state in view of these considerations, an appropriate brightness ratio can be defined between the transmission and reflection modes according to the application of each panel.

In the preferred embodiment described above, a liquid crystal display device is formed so as to include the polarizing optical element 20 of the third preferred embodiment in the first substrate 21 thereof. However, the present invention is in no way limited to that specific preferred embodiment. For example, the polarizing optical element 20 may be provided between the first substrate and backlight of a conventional liquid crystal display device as it is. Nevertheless, to make use of the advantageous features of the polarizing optical element according to a preferred embodiment of the present invention (e.g., its reduced thickness and increased contrast ratio) effectively enough, the polarizing optical element 20 is preferably incorporated into the display device as described above. Among other things, if the multilayer structure 10 of the polarizing optical element 20 is provided on the substrate of the liquid crystal display device as in the preferred embodiment described above, then the substrate 1 of the polarizing optical element 20 can be omitted. Thus, not only the thickness of the display device but also the manufacturing cost thereof can be reduced advantageously.

According to this preferred embodiment, the light can be used very efficiently with the thickness of the display device reduced significantly. Hereinafter, these advantageous features of the transflective liquid crystal display device of this preferred embodiment will be described in detail by comparing it with a conventional transflective liquid crystal display device.

Figure 11:
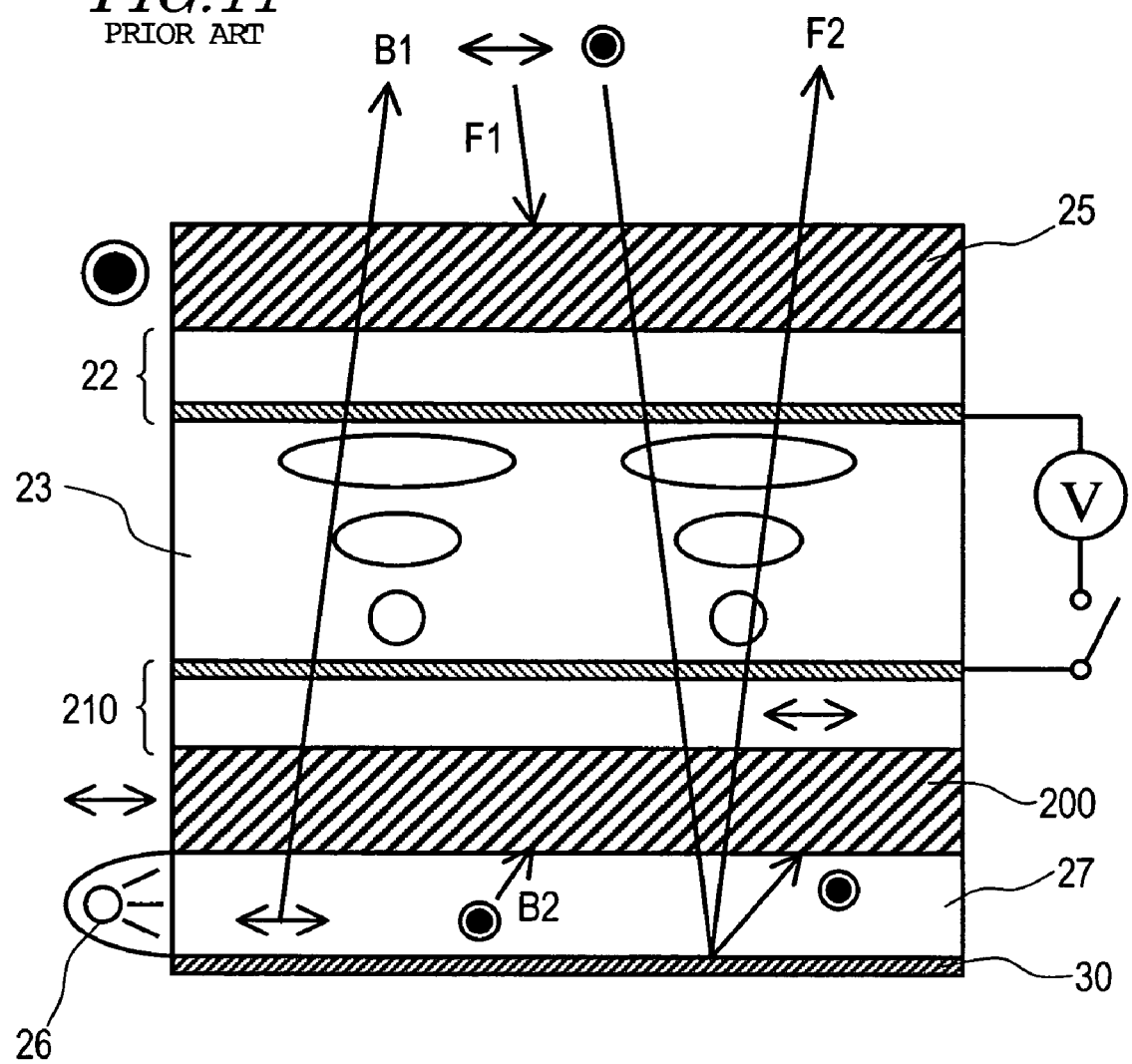
FIG. 11 is a cross-sectional view schematically illustrating a conventional transflective liquid crystal display device.

In this example, a display device such as that shown in FIG. 11 is used as a conventional transflective liquid crystal display device. This device uses an absorptive polarizer 200, which is identical with the absorptive polarizer 25 of the second substrate 22, as the polarizer of the first substrate 210. The absorptive polarizer 200 is provided between the first substrate 210 and the backlight 26 such that the absorption axis of the absorptive polarizer 200 crosses that of the absorptive polarizer 25 of the second substrate 22 at right angles.

When the transflective liquid crystal display device shown in FIG. 11 operates in the transmission mode, only a polarized light ray B1, of which the polarization direction is parallel to the transmission axis of the absorptive polarizer 200, is used for display purposes in the light that has been emitted from the backlight 26. Thus, supposing the quantity of the light emitted from the backlight 26 is B, the quantity of light that can be used for display purposes is at most 0.5B. On the other hand, a polarized light ray B2, which has been emitted from the backlight 26 and which has a polarization direction that is parallel to the absorption axis of the absorptive polarizer 200, is absorbed into the absorptive polarizer 200 and is not used for display purposes.

In the reflection mode on the other hand, among externally incoming light rays, a polarized light ray F1, of which the polarization direction is parallel to the absorption axis of the absorptive polarizer 25, is absorbed into the absorptive polarizer 25 and cannot be used for display purposes. However, a polarized light ray F2, of which the polarization direction crosses that of the polarized light ray F1 at right angles, passes through the liquid crystal layer 23 while having its polarization direction rotated, transmitted through the absorptive polarizer 200, and then reflected from the reflective layer 30 behind the optical waveguide 27. Thereafter, the polarized light ray F2 passes through the absorptive polarizer 200 and liquid crystal layer 23 again to return to the viewer. In this case, if the degree of depolarization caused by the optical waveguide 27 and reflective layer 30 is $\alpha$ (where $0<\alpha<1$), then the quantity of light, which has externally entered the display device in a quantity F and then returns to the viewer in the end, can be represented as $0.5 \alpha F$.

Accordingly, in the conventional transflective display device shown in FIG. 11, the quantity of light that can be used for display purposes is ideally $0.5B+0.5 \alpha F$ in the light that has been emitted from the backlight 26 in the quantity B and the light that has externally entered the display device in the quantity F.

On the other hand, in the transflective liquid crystal display device of the fifth preferred embodiment shown in FIG. 9, not just the polarized light ray B1, of which the polarization direction is parallel to the transmission axis of the polarizing optical element 20 (i.e., a TM wave with a light quantity of 0.5B), but also a portion of a TE wave B2, of which the polarization direction crosses that of the polarized light ray B1 at right angles, can be used for display purposes in the light that has been emitted from the backlight 26 in the quantity B. The TE wave B2 is not absorbed into, but reflected from, the polarizing optical element 20, and then repeatedly reflected from the reflective layer 30 behind the optical waveguide 27 and from the polarizing optical element 20. In the meantime, a portion of the TE wave B2 is depolarized by the optical waveguide and reflective layer 30, and can be transmitted through the polarizing optical element 20 and used for display purposes. Accordingly, the quantity of light that has been emitted from the backlight 26 with the quantity B and then can be used for display purposes eventually is ideally represented as $0.5B+0.5 \alpha B+0.5(1-\alpha)\alpha B+ \ldots$, where $\alpha$ ($0<\alpha<1$) is the degree of depolarization caused by the optical waveguide and reflective layer 30.

In the externally incoming light (with a quantity F) on the other hand, a polarized light ray F1, of which the polarization direction is parallel to the absorption axis of the absorptive polarizer 25, is absorbed into the absorptive polarizer 25 and cannot be used for display purposes. However, a polarized light ray F2 (with a quantity of 0.5F), of which the polarization direction crosses that of the polarized light ray F1 at right angles, enters and passes through the liquid crystal layer 23 while having its polarization direction rotated, is transmitted through the polarizing optical element 20, and then reflected from the reflective layer 30 behind the optical waveguide 27. Thereafter, the polarized light ray F2 passes through the polarizing optical element 20 and liquid crystal layer 23 again to return to the viewer. In this case, if the degree of depolarization caused by the optical waveguide 27 and reflective layer 30 is $\alpha$ (where $0<\alpha<1$), then the quantity of light, which has externally entered the display device in the quantity F and can be used for display purposes in the end, is ideally represented as $0.5 \alpha F+0.5(1-\alpha)\alpha F+$ and so on.

Consequently, the transflective display device of this preferred embodiment can use light, of which the overall quantity is greater than $0.5B+0.5 \alpha B+0.5(1-\alpha) \alpha B+0.5 \alpha F+0.5(1-\alpha) \alpha F$, for display purposes in the light that has been emitted from the backlight 26 with the quantity B and the light that has externally entered the display device with the quantity F. This overall light quantity is greater than the quantity of light ($0.5B+0.5 \alpha F$) that the conventional transflective display device can use for display purposes. Thus, it can be seen that the optical efficiency can be increased according to this preferred embodiment.

Figure 12:
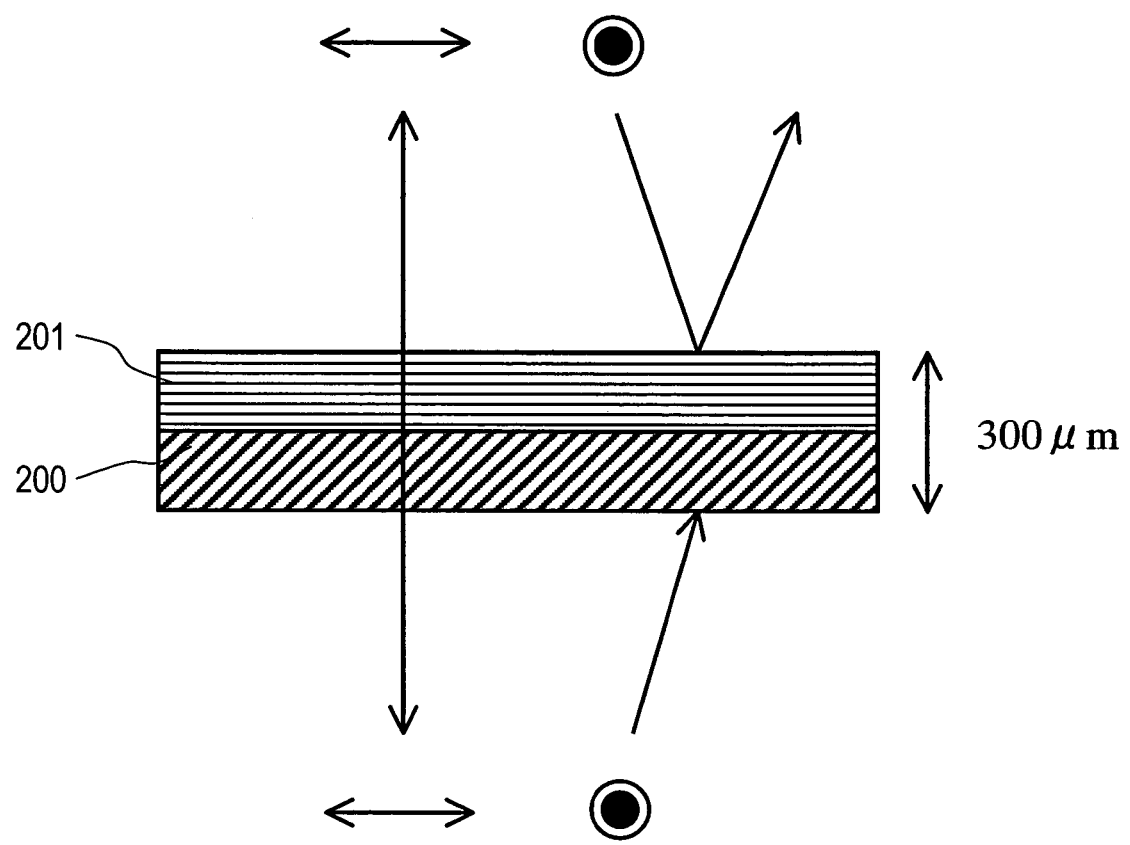
FIG. 12 is a cross-sectional view schematically illustrating a conventional polarizer unit obtained by bonding an absorptive polarizer and a reflective polarizer together.

As described above, the conventional transflective liquid crystal display device shown in FIG. 11 achieves just low optical efficiency and displays a rather dark image. Thus, to increase the optical efficiency, a transflective liquid crystal display device using a linearly polarized light reflecting polarizer as well as the absorptive polarizer was proposed by Japanese Laid-Open Publication No. 9-90122, for example. As shown in FIG. 12, a display device of that type includes a polarizer unit (with a thickness of 300 μm, for example), which includes an absorptive polarizer 200 (with a thickness of 100 μm, for example) and a reflective polarizer 201 (with a thickness of 200 μm, for example) in combination and which reflects a TE wave at a different reflectance depending on the angle of incidence thereof.

Hereinafter, the advantageous features of the transflective liquid crystal display device of this preferred embodiment will be described by comparing it with a conventional transflective liquid crystal display device including the polarizer unit shown in FIG. 12.

Figure 13:
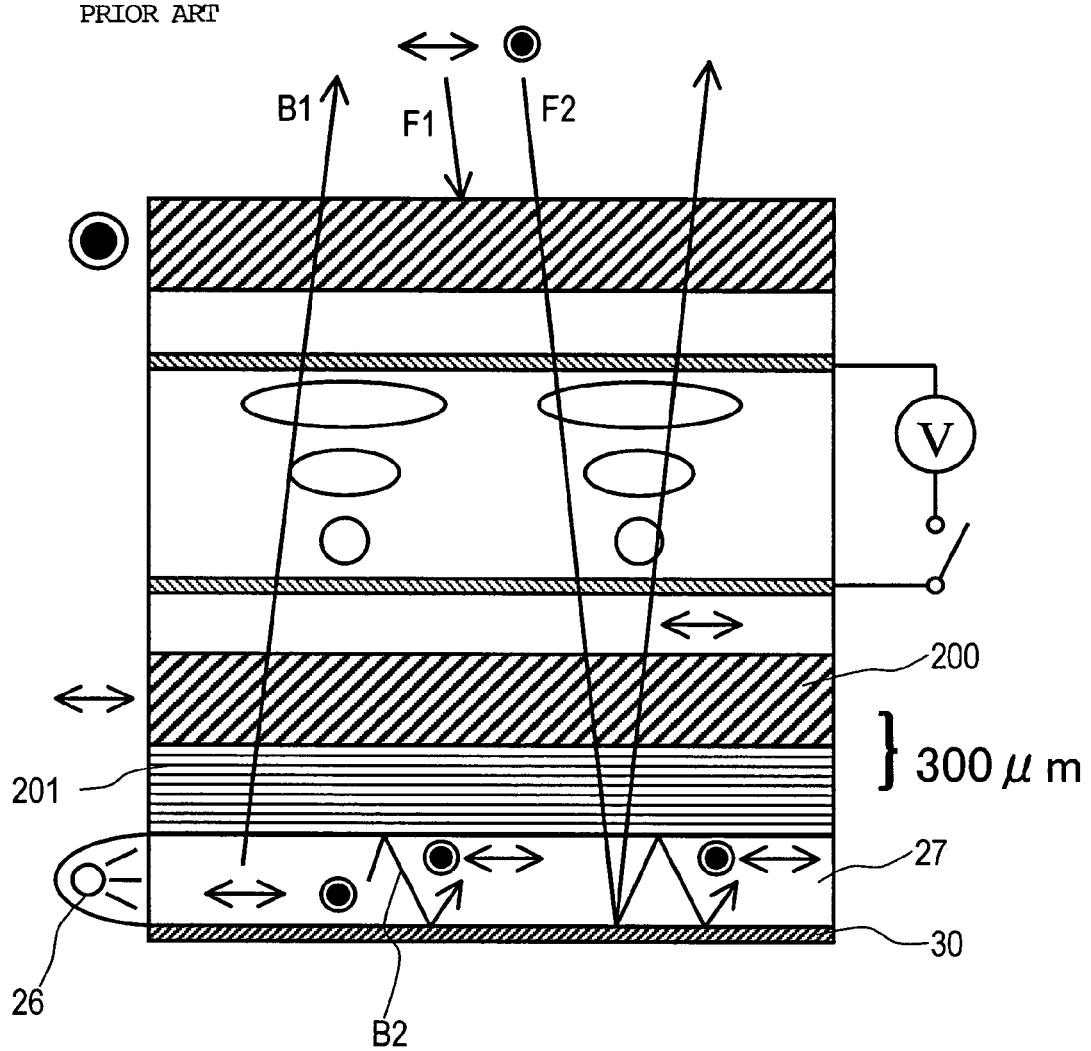
FIG. 13 is a cross-sectional view schematically illustrating a conventional transflective liquid crystal display device including the polarizer unit shown in FIG. 12.

FIG. 13 is a cross-sectional view schematically illustrating a transflective liquid crystal display device including the polarizer unit shown in FIG. 12. This display device includes a linearly polarized light reflecting polarizer 201 (with a thickness of 0.20 mm, for example) between the absorptive polarizer 200 (with a thickness of 0.10 mm, for example) in the first substrate 210 and the backlight 26. This reflective polarizer 201 reflects a linearly polarized light ray having a particular polarization direction and transmits a polarized light ray of which the polarization direction crosses that of the linearly polarized light ray at right angles. The linearly polarized light reflecting polarizer 201 is a stack of non-absorbing dielectric materials (e.g., obtained by alternately stacking two different types of polymers A and B as ABABA . . . ).

The transflective liquid crystal display device shown in FIG. 13 uses the absorptive polarizer 200 and reflective polarizer 201 in combination, and therefore, can recycle portions of the light emitted from the backlight and the ambient light as well as the display device of the fifth preferred embodiment. The display device shown in FIG. 13 achieves almost as high recycling efficiency and optical efficiency as those achieved by the display device of the fifth preferred embodiment. However, the display device shown in FIG. 13 includes the polarizer unit and therefore has an increased thickness. Specifically, supposing the absorptive polarizer on the viewer side has a thickness of 0.1 mm, the liquid crystal panel has a thickness of 1.4 mm, the polarizer unit on the rear side has a thickness of 0.3 mm and the backlight unit has a thickness of 1.5 mm, the display device shown in FIG. 13 has an overall thickness of 3.3 mm. On the other hand, the display device of the fifth preferred embodiment shown in FIG. 9 has an overall thickness of 3.0 mm. Thus, it can be seen that the display device of the fifth preferred embodiment is about 0.3 mm thinner than the counterpart shown in FIG. 13. This difference of 0.3 mm in thickness accounts for approximately 10% of the overall thickness of the display device.

Consequently, according to this preferred embodiment, the optical efficiency can be kept sufficiently high and yet the thickness of the display device can be reduced significantly by using the polarizing optical element 20 (of which the multilayer structure 10 has a thickness of 0.2 µm) in place of the absorptive polarizer 200 (with a thickness of 0.10 mm) and the reflective polarizer 201 (with a thickness of 0.20 mm).

Various preferred embodiments of the present invention described above provide a polarizing optical element, which realizes a high-contrast display even when applied to a display device by itself and which ensures excellent optical efficiency with a significantly reduced thickness.

A polarizing optical element according to any of various preferred embodiments of the present invention described above can be used effectively as a polarizer for a transmissive, reflective or transflective display device.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC § 119(a) on Patent Applications No. 2003-180995 filed in Japan on Jun. 25, 2003 and No. 2004-156463 filed in Japan on May 26, 2004, the entire contents of which are hereby incorporated by reference.

What is claimed is:

1. A polarizing optical element that changes its optical reflectance and/or transmittance according to a polarization state of incoming light, the optical element comprising:
   a first grating layer including multiple striped portions that extend in a predetermined direction; and
   a second grating layer including multiple striped portions that extend in that predetermined direction;
   wherein average grating pitches of the first and second grating layers are both defined to be shorter than the wavelength of the incoming light, and
   wherein the first grating layer is made of a first material that exhibits a light reflecting property to the incoming light, and
   wherein the second grating layer is made of a second material that reduces the reflection of the incoming light from the first grating layer.

2. The polarizing optical element of claim 1, wherein the second material exhibits a light absorbing property.

3. The polarizing optical element of claim 1, wherein the reflectance exhibited by the second material to the incoming light is lower than that exhibited by the first material to the light.

4. The polarizing optical element of claim 1, wherein the multiple striped portions of the first grating layer have the same shape as, and overlap with, the striped portions of the second grating layer.

5. The polarizing optical element of claim 1, wherein each said striped portion of the first grating layer and an associated one of the striped portions of the second grating layer make up a multilayer structure that is supported on a substrate.

6. The polarizing optical element of claim 5, wherein the multilayer structure is asymmetric when rotated 180 degrees around an axis that is defined in the predetermined direction.

7. The polarizing optical element of claim 5, wherein the first grating layer is either the lowermost or uppermost layer of the multilayer structure.

8. The polarizing optical element of claim 1, wherein the first grating layer is provided on one surface of the substrate and the second grating layer is provided on the other surface of the substrate.

9. The polarizing optical element of claim 1, wherein the first grating layer exhibits a reflectance exceeding 50% to a linearly polarized visible light ray.

10. The polarizing optical element of claim 1, further comprising a transparent layer, which covers the multiple striped portions and has a substantially flat surface.

11. The polarizing optical element of claim 10, wherein the transparent layer is made of a dielectric material.

12. A display device comprising the polarizing optical element of claim 1.

13. A liquid crystal display device comprising a first substrate, a second substrate, and a liquid crystal layer sandwiched between the first and second substrates so as to conduct a display operation by applying a voltage to the liquid crystal layer,
   wherein the liquid crystal display device further includes a polarizing optical element, which is provided between the first substrate and the liquid crystal layer so as to change its optical reflectance and/or transmittance according to a polarization state of incoming light, and
   wherein the polarizing optical element has a multilayer structure including multiple striped portions that are arranged on the first substrate so as to extend in a predetermined direction, an average grating pitch of the multilayer structure being defined to be shorter than the wavelength of the incoming light, and wherein the multilayer structure includes:

a first grating layer, which is made of a first material that exhibits a light reflecting property to the incoming light; and a second grating layer, which is provided closer to the liquid crystal layer than the first grating layer is and which is made of a second material that reduces the reflection of the incoming light from the first grating layer.

* * * * *